United States Patent
Ostendarp

(10) Patent No.: US 8,235,337 B2
(45) Date of Patent: Aug. 7, 2012

(54) VACUUM LIFTER

(75) Inventor: Heinrich Ostendarp, Haan (DE)

(73) Assignee: Bohl AG, Haan (DE)

( * ) Notice: Subject to any disclaimer, the term of this patent is extended or adjusted under 35 U.S.C. 154(b) by 0 days.

(21) Appl. No.: 12/889,584

(22) Filed: Sep. 24, 2010

(65) Prior Publication Data

US 2011/0127395 A1    Jun. 2, 2011

Related U.S. Application Data

(63) Continuation of application No. PCT/EP2009/053548, filed on Mar. 25, 2009.

(30) Foreign Application Priority Data

Mar. 25, 2008  (DE) .......................... 10 2008 015 648
Sep. 29, 2009  (EP) ..................................... 09012359

(51) Int. Cl.
*F16B 47/00* (2006.01)

(52) U.S. Cl. ................................. 248/205.7; 248/205.8

(58) Field of Classification Search ............... 248/205.6, 248/205.7, 205.8, 205.9, 206.1, 206.2, 206.3, 248/206.4, 363, 362
See application file for complete search history.

(56) References Cited

U.S. PATENT DOCUMENTS

| 5,184,858 A * | 2/1993 | Arai ............................ 294/64.1 |
| 7,475,860 B2 * | 1/2009 | Chien et al. ................... 248/363 |
| 7,665,706 B2 * | 2/2010 | Chien et al. ................... 248/542 |
| 7,753,324 B2 * | 7/2010 | Chien et al. ............... 248/205.8 |
| 2004/0124325 A1 | 7/2004 | Kwok |
| 2009/0166490 A1 * | 7/2009 | Liao .......................... 248/205.8 |
| 2010/0146697 A1 | 6/2010 | Roth |

FOREIGN PATENT DOCUMENTS

| DE | 18 06 451 A1 | 10/1969 |
| DE | 20 2007 008376 U1 | 9/2007 |
| GB | 1193899 A | 6/1970 |

* cited by examiner

*Primary Examiner* — Kimberly Wood
(74) *Attorney, Agent, or Firm* — Panitch Schwarze Belisario & Nadel LLP

(57) ABSTRACT

A vacuum suction device is provided for temporary fixing on a substantially smooth, air-impermeable fixing area, including a supporting cup (3) and a flexible suction plate (4) as well as an actuating mechanism for creating a partial vacuum between the suction plate and the fixing area while dislocating the suction plate at least in parts thereof, wherein a vacuum indication device (15) for indicating the partial vacuum is provided. To provide a constructionally simple indication device by which a decrease in partial vacuum can be easily and reliably detected even by a non-trained individual and even under different environmental conditions, the vacuum indication device is provided with an indicating element (16), which is mechanically coupled to the suction plate. By the indicating element (16), a change in partial vacuum can be optically and/or haptically detected and indicated. The indication device can be integrated in the actuating element.

27 Claims, 12 Drawing Sheets

VACUUM LIFTER

BACKGROUND OF THE INVENTION

This invention relates to a vacuum suction device, in particular a vacuum lifter, intended for temporary fixing on a substantially smooth, air-impermeable fixing area and comprising a supporting cup and a flexible suction plate as well as an actuating mechanism for creating a partial vacuum between the suction plate and the fixing area while dislocating the suction plate at least in some regions, with an indication device for indicating the partial vacuum being provided and having an indicating element that is mechanically coupled to the suction plate.

In a vacuum suction device, the indication of the partial vacuum is frequently desired with regard to the operation safety of the vacuum suction device to thus prevent that the vacuum suction device is loaded even though the partial vacuum falls below the minimum partial vacuum and that the vacuum suction device unexpectedly detaches from the fixing area. This may apply to the use of the vacuum suction device for lifting objects, in order to avoid damage to the object that includes the fixing area, or to the employment of the vacuum suction device as a handle that is temporarily fixed on a fixing area and used by individuals for instance as an additional grip handle allowing the individual to move more safely in certain surroundings, e.g. in sanitary areas. It is important in this case to be able to check if the partial vacuum is sufficient for guaranteeing personal safety under the loads to be expected.

Vacuum suction devices having means for indicating the partial vacuum are known. In such devices, the partial vacuum is measured directly in the vacuum chamber formed between the suction plate and the fixing area and is indicated by means of an electronic indication device or manometer indication. The determination of the vacuum by applying measuring techniques is comparatively complex in these devices. Further, the indication is based on indication devices in which the indicated parameters are frequently difficult to read and which are operated by technically non-trained personnel. It is not always easy for such individuals to realize on the indication device that a predetermined partial vacuum has decreased below the limit. Further, if the vacuum suction device is used in the sanitary area, for instance to make it easier for an individual to move in a bathroom, swimming pool or the like, it must be taken into account that the indication device is often subject to splash water, condensate etc. and cannot be read for this reason. On the other hand, an electronic device requires complicated encapsulation or does not work correctly. On the other side, such vacuum suction devices can partly be employed also in surroundings with an increased dirt and dust exposure, in which case a manometer indication device is susceptible to malfunction. Safe operation of the indication device is thus not possible under such conditions.

A mechanical design of an indication device of a vacuum lifter is known from German utility model DE 20 2007 008 376 U1. But this indication device is integrated in the suction plate, so that its manufacture is complicated. Further, special designs of the suction plate are required if a vacuum lifter having an indication device is to be provided instead of a vacuum lifter without an indication device. This requires additional stock-keeping, if necessary of the entire assembly consisting of handle and suction plate, and is an obstacle to modular construction. Further, it is difficult for untrained individuals to find the indication device, because it is integrated and hidden in the suction plate.

BRIEF SUMMARY OF THE INVENTION

The invention is thus based on the object of providing a vacuum suction device, in which the indication device has a simple construction and in which a decrease in the partial vacuum can be easily and reliably detected also by untrained individuals and under various environmental conditions, and which allows the indication to be easily seen.

This object is achieved by a vacuum suction device intended for temporary fixing on a substantially smooth, air-impermeable fixing area, especially a vacuum lifter, comprising a supporting cup and a flexible suction plate as well as an actuating mechanism for creating a partial vacuum between the suction plate and the fixing area while changing the position of the suction plate at least in some regions, wherein a vacuum indication device for indicating the partial vacuum and including an indicating element is provided and wherein the indicating element of the vacuum indication device is coupled to the suction plate and performs a movement between an initial position at a maximum partial vacuum and an end position of indication at a loss of partial vacuum, characterized in that the indicating element or at least a part of the indication device is integrated in the actuating element or that the indication device includes a mechanical coupling mechanism which mechanically couples the indicating element to the suction plate, wherein (i) the indication device is designed such that it causes an indication through the indicating element if the partial vacuum decreases and if a threshold is reached and such that the level of the threshold is defined by the mechanical coupling mechanism independently of a frictional connection, or (ii) the coupling mechanism is designed in the form of a mechanical displacement transmission so that in the case of a decrease in vacuum it translates dislocations or deformations of the suction plate in a force transmitting fashion into amplified displacement of the indicating element from the beginning of the vacuum loss and during the extension movement of the indicating element toward its end position of indication.

The object is also achieved by a vacuum suction device intended for temporary fixing on a substantially smooth, air-impermeable fixing area, especially a vacuum lifter, comprising a supporting cup and a flexible suction plate as well as an actuating mechanism for creating a partial vacuum between the suction plate and the fixing area while changing the position of the suction plate at least in some regions, wherein a vacuum indication device for indicating the partial vacuum and including an indicating element is provided and wherein the indicating element of the vacuum indication device performs a movement between an initial position at a maximum partial vacuum and an end position of indication at a loss of partial vacuum, characterized in that the indicating element is mechanically coupled to the suction plate by means of a coupling mechanism and such that the coupling mechanism is designed in the form of a mechanical displacement transmission which during the extension movement of the indicating element to its extended end position continuously couples the suction plate to the indicating element in a force-transmitting fashion and on a decrease in vacuum and during the extension movement of the indicating element translates, with the indicating element, dislocations or deformations of the suction plate in a force-transmitting fashion into amplified displacements of the indicating element toward its end position of indication.

In the vacuum lifter according to the invention, the indicating element or at least a part of the indication device is integrated in the actuating element. The indicating element is thus easily visible and not concealed by other components. If a vacuum suction device is to be assembled which includes an indication device, a conventional suction plate can be used as a basis, so that it is sufficient to merely provide a different actuating element which preferably already includes an indicating element. All the components of the indication device which are different from the actuation device, can be fully integrated in the actuation device and can be mounted to and/or demounted from the vacuum suction device together with the actuation device. This particularly applies to the indicating element which is designed as a separate element and for displacement with respect to the actuating element, a spring member of the indication device and/or at least a distance transmitting coupling element of a coupling mechanism between the suction plate and the indicating element or the entity of the stated components. Then, for demounting the actuating element, only this minimum number of connections and preferably only one connection between the actuating element and the component fixed to it has to be separated. Additionally, such a mechanical indication device is particularly robust and always works reliably also under adverse environmental conditions and it is practically not influenced by external factors such as moisture, dust or the like. Generally within the scope of the invention, the indication element can be designed as a separate component and can be supported for pivoting on the actuating element and so as to be variable in its position with respect to the actuating element. Within the scope of the invention, an "actuating element" is particularly understood to mean the element intended to be grasped and operated manually in order to move the vacuum lifter from its fixing state, i.e. with the creation of a partial vacuum. This element can be particularly designed as a rocker.

In one embodiment, the vacuum lifter of the invention includes an indication device for indicating the partial vacuum. This indication device has an indicating element that is mechanically coupled to the suction plate using a coupling mechanism. The indicating element performs a movement between an initial position under a maximum vacuum and a final indication position under a partial vacuum loss.

Due to the mechanical coupling of the indicating element to the suction plate a change of the position of the indicating element which takes place as a consequence of a change in partial vacuum can always be reliably detected by the operator even under adverse environmental conditions such as moisture or dust. The indication can take place for instance such that with an increasing reduction of the partial vacuum, the indicating element increasingly emerges with respect to a reference part such as a scale, a housing part or the like, so that even a relatively small loss in partial vacuum can be reliably detected by the use of the indicating element. The indicating element can be mechanically coupled to the suction plate either directly or via a coupling element forming an extension of the indicating element, so that a partial dislocation or deformation of the suction plate causes a dislocation of the indicating element. To this end, the indicating element can be connected to the suction plate in a force-absorbing manner. Further, the indication device can be designed such that it indicates only a lower deviation of a predetermined minimum partial vacuum or also such that a continuous reduction of the partial vacuum can be observed via the indicating element, which is adapted for changing its position gradually or continuously with the change in the partial vacuum.

According to an embodiment of the invention, the coupling mechanism is designed as a mechanical displacement transmission which, during the extension of the indicating element to its extended end position, at least temporarily or preferably continuously couples the suction plate to the indicating element in a force-transmitting fashion and, during a vacuum reduction, converts dislocations or deformations of the suction plate during the extension of the indicating element toward its end position into amplified displacements of the indicating element in a force-transmitting fashion using the indicating element (hence exerts the force on the indicating element in a direction toward its extension movement). This can apply to the entire extension movement of the indicating element between its initial and end positions or at least to a part of the extension movement after leaving the initial position, especially to the part of the extension movement which is the middle part referred to the distance between the initial position and the end position or to the part of the extension movement involving the largest dislocation of the indicating element at a given incremental vacuum loss, e.g. for each 0.05 bar. Particularly, this can apply if the indicating element has already traveled more than 5-10% of its way toward the end position. "Force transmission" means that a force is exerted on the indicating element from the suction plate through the coupling mechanism to the indicating element in the direction toward its end position, preferably while the coupling mechanism remains coupled to the indicating element and the suction plate and particularly preferably during the entire extension movement. "Continuous" coupling means permanent coupling throughout the extension movement of the indicating element, namely in a force-transmitting fashion in the direction toward the end position of the indicating element, so that the force which is exerted forces and moves the indicating element toward its end position. In a first variant, the indication device is designed such that, during a decreasing partial vacuum and after a threshold value is reached, it causes an indication through the indicating element, and such that the threshold level is defined by a mechanical coupling mechanism independently of a frictional connection. In a second variant, the coupling mechanism is designed as a mechanical displacement transmission which, during a decrease in vacuum and from the beginning of a vacuum loss during the extension of the indicating element toward its end position, converts dislocations and or deformations of the suction plates into amplified displacements of the indicating element in a force-transmitting fashion using the indicating element.

Particularly preferably, the vacuum indication device can be so designed that the indicating element indicates a change in the partial vacuum through optical and/or haptic detection. An optical indication can be performed such that, with a decreasing partial vacuum in the vacuum chamber, the indicating element is displaced so as to project from the vacuum suction device at an increasing degree with respect to a reference point or, where appropriate, so as to project from the vacuum suction device at a decreasing degree while being increasingly retracted for example into a housing component of the vacuum suction device. A haptic detection of a change in the indication position of the indicating element is possible by manual palpation of the increased or decreased degree of projection with respect to a reference point, for example a housing component. Particularly at a maximum partial vacuum, taking into account a tolerable fluctuation, the indicating element can terminate flush with the housing component or with a different adjacent component and can project from the same with a continued decrease in the vacuum, thus making the palpation of the change in the position of the indicating element particularly easy.

Particularly preferably, the indicating element of the indication device is mechanically coupled or connected to the suction plate, especially to a part thereof which preferably performs a positional change which is as large as possible during a change in the partial vacuum, such as e.g. the middle part of the suction plate, which, when it is subject to a partial vacuum, experiences a relatively large dislocation compared to the rim of the suction plate which is fixed on the fixing area.

Generally, the indicating element can be directly or indirectly coupled to the suction plate. In the case of a direct coupling, at least one coupling element can be provided. If the suction plate is provided with a stiffening element that can be arranged in the middle part thereof, the indicating element can be directly or indirectly coupled mechanically to the stiffening element. The stiffening element can be a stiffening plate, which is vulcanized to the suction plate that can be made of steel or any other suitable material. Preferably, the stiffening element is plate-like and is connected flat to the suction plate.

Alternatively, the object of the invention is achieved by a vacuum suction device in which the indication device is designed such that the indication is effectuated by the indicating element when the partial vacuum decreases and reaches a predetermined threshold, the level of the threshold being defined by a mechanical coupling mechanism independently of a frictional contact. It is not necessarily required for the indication device to be at least mainly or fully integrated in the actuating element, which needs not necessarily apply to the indicating element or the indication device. The indication device, e.g. also the indicating element, can be arranged for example partially or mainly on the suction plate or it can be integrated in the suction plate or be arranged on or integrated in a different element of the suction device, e.g. an additional housing component.

The indication device preferably comprises a coupling mechanism including at least one coupling element. Preferably, this coupling mechanism continuously or suddenly converts, through mechanical coupling, even small dislocations of the suction plate or of a part of the suction plate caused by changes in the partial vacuum as a result of a decreasing vacuum into amplified displacements of the indicating element either continuously or abruptly. The indication device accordingly has a very high sensitivity. The dislocations of the suction plate or of a part of the suction plate can be translated into amplified displacements of the indicating element either gradually or continuously through mechanical coupling. Due to the continuous, preferably mechanical coupling of the indication device or the indicating element to the suction plate, the indication device is particularly reliable, robust and durable, even under difficult environmental conditions. If necessary, the coupling mechanism can be a mere lever or a lever-spring and/or gear mechanism or gear. It can generally be free from hydraulic and/or pneumatic elements such as power transmission elements or it can include such elements where required.

Particularly preferably, the indication device is designed such that at an increasing reduction of the partial vacuum, the indicating element is brought to a position which indicates a vacuum loss only when a particular partial vacuum threshold is exceeded (i.e. only above a predetermined absolute pressure in the hollow space between the suction plate and the fixing area) and not whenever some small vacuum loss occurs. The indication device can be particularly designed such that the threshold is defined by a spring element causing the indicating element to be moved to its indication position and by a transmission ratio of a mechanical coupling mechanism, hence independently of a frictional contact that has to be overcome and in a mechanically specifically controlled fashion. The coupling mechanism may include one or more displacement and/or force transmitting elements like pivot levers. On the other hand, if the partial vacuum loss is relatively low, i.e. at a lower deviation of the partial vacuum threshold, and taking into account the counteracting spring force of a spring member of the indicating element, the vacuum power of the partial vacuum may be sufficient for the indicating element in its non-indicating or initial position to be urged against a first limit stop by a certain pressure force, so that an indication does not take place. This spring can be integrated in the actuating element. Only if the partial vacuum decreases below a certain threshold, the spring force of the spring element of the indicating element is sufficient for the indicating element to lift off from its first limit stop. The indicating element can generally be driven to its indication position, for example against a second limit stop defining the maximum indication position, in a fashion increasing proportionally to the vacuum loss, but the progression of the indication can also be non-linear, in which case the indication takes place constantly, for example continuously or gradually with several indication positions and preferably in a practically abrupt movement according to the vacuum curve. This function principle can be achieved especially by the arrangement of a separate spring element of the indication device which acts on the indicating element, preferably in combination with a coupling or transmission mechanism. The scope of the invention generally provides that the vacuum suction device can be operated as intended, if a partial vacuum is available which exceeds the predetermined minimum vacuum threshold to such an extent that the desired holding power of the vacuum suction device on the fixing area is definitely given.

Generally within the scope of the invention and particularly preferably, the indication device can be alternatively or additionally designed in such a way that, when the actuating element is actuated while a partial vacuum is produced, the indicating element is moved to a position that indicates an existing partial vacuum, e.g. against a first limit stop (if provided), only after a certain minimum partial vacuum is reached (i.e. only below a certain absolute pressure in the hollow space between the suction plate and the fixing area). Otherwise, the indicating element is allowed to remain situated against a second limit stop. Preferably, this threshold corresponds to a partial vacuum that is achieved at minimum, if the device is duly operated and used, the indicating element then being in its "initial position". The movement to the position which indicates a minimum partial vacuum takes place in a controlled manner through the force which is exerted from the suction plate via the coupling mechanism to the indicating element at the respective partial vacuum, wherein the control is mechanically defined and thus preferably exclusively by the lever ratios and spring forces of the coupling mechanism and not by members for instance which operate independently of a frictional connection. The level of the minimum partial vacuum at which the completely retracted position of the indication device is achieved and/or the behavior of the indication device until it reaches its extended position that indicates a vacuum loss, can be selectively designed or defined differently by differently designing the spring element that acts on the indication device and the mechanical transmission and coupling devices, especially their transmission ratios. Accordingly, on the basis of a minimum partial vacuum (fully retracted position of the indicating element), the extended position (reaching of the partial vacuum threshold) can be preferably achieved in an approximately linear or otherwise defined relationship with the partial vacuum loss. In a particularly advantageous embodiment, during the loss in the partial vacuum down to the partial vacuum threshold, the indication device remains in its fully retracted position to be then moved preferably by an at least substantially sudden movement to the indication position in which it can contact the second limit stop. The suction lifter can be returned to its safe operating position (initial state) only after it has been duly actuated once again. In this case, the design of the indication device guarantees that the retracted position of the indicating element can be resumed only after certain minimum partial vacuum has been reached (i.e. only below a certain absolute pressure between the suction lifter and the fixing area). This behavior generally corresponds to a switching hysteresis. Even in this case, the coupling mechanism may comprise one or more displacement and/or force transmitting elements such as pivot levers. It will be understood that the present coupling mechanism is preferably the same as the coupling mechanism that causes the above-described movement of the indicating element to its position indicating a loss in partial vacuum. A corresponding design of the spring element and of the mechanical transmission and coupling mechanisms allows achieving even transient forms between the at least substantially linear form and the at least substantially abrupt form (switching hysteresis).

The coupling mechanism of the indication device may generally include a displacement transmission system causing minor dislocations of the suction plate or of a part of the suction plate to be translated into amplified displacements of the indicating element. This displacement transmission system may include at least one or more mechanical coupling elements in the form of pivot levers which are eccentrically supported. The shorter part of the two lever parts of the coupling element can be respectively arranged so as to be facing the suction plate. It is also possible to provide two or more such pivot elements, and even the indicating element can be designed as such a pivot element. The pivot levers can each be designed in a linear fashion and if necessary also as knee or angle levers or any other suitable lever element. Some or all of the coupling elements transmitting the displacement or other coupling elements can be designed as pneumatic and/or hydraulic coupling elements. Thus the coupling can generally be a mechanical, pneumatic and/or hydraulic coupling, preferably a mechanical coupling. Where required, the progressive coupling can also be an electric coupling, preferably in combination with an electrical indication device. Due to this transmission mechanism, it is not only possible to indicate that a limit such as the above-mentioned upper and lower thresholds of the partial vacuum has been reached in the course of a decreasing partial vacuum, hut also to monitor or observe the change in the partial vacuum over a certain period of time.

By the eccentric supporting of one or more coupling elements of the indication device which are designed as pivot levers and/or the indicating element of the indication device and/or by the selection of the spring force of the spring of the indication device, a transmission can be provided in which the ratio of the transmission of the dislocation of the part of the suction plate to the (greater) displacement of the indicating element can be varied by a simple construction or in which the above-described thresholds of an upper and/or lower partial vacuum, at which the indicating element is moved to its indication or initial position, can be adjusted in a constructionally simple way. Generally, the indicating element itself can be designed as a transmission element, e.g. as an eccentrically supported lever. To this end, the leverage ratios can be appropriately selected on one or more of the pivot levers, and it may be sufficient to merely change the position of the pivot or supporting points of the respective coupling elements or to employ a spring having a different spring constant. The rest of the structure of the indication device can remain unchanged. It will be understood that particularly large transmission ratios can be achieved if two or more such coupling elements, which cause a transmission of the displacement, are arranged one behind the other.

The transmission of the displacement of the coupling mechanism is preferably also accompanied by a transmission of forces (with an inverse transmission ratio). Accordingly, the indication device has an associated spring element (e.g. a pressure spring). (This spring element is preferably different from a possible spring element of the actuating mechanism.) The force of the spring element which has been increased by the inversed transmission ratio can be counteracted by the considerably smaller force of the spring element of the actuating mechanism in addition to the force caused by the partial vacuum. At the actuation of the vacuum suction device for creating a partial vacuum, the latter-mentioned spring element can be biased while the actuating element is simultaneously moved to its actuation position. The indicating element can be positioned in its initial position by being spring-loaded by the spring element of the indication device. Due to the transmission mechanism of the indication device which represents a transmission of force decreasing in the opposite direction with an increasing transmission of displacement, the spring element can be loaded by applying a relatively small force when the actuating mechanism is actuated.

The coupling mechanism or the displacement transmission between the suction plate and the indicating element are preferably designed such that the position of the indicating element during a part of or the entire extension movement of the indicating element which is caused by a vacuum loss, is determined by a balance of forces between the vacuum power of the partial vacuum applied to the suction plate and a spring force exerted by the coupling mechanism or the displacement transmission to the suction plate, namely precisely oppositely to the vacuum power. This particularly applies to a position of the indicating element after the beginning of the extension movement, i.e. to a partly extended indicating element. To this end, the coupling mechanism or the displacement transmission preferably include a spring element whose spring force is amplified toward the suction plate precisely through this transmission which is provided. Accordingly, there is a continuous force chain (force transmission line) between the suction plate and the indicating element during the entire extension movement of the indicating element from its initial position (maximum partial vacuum) to its end position or at least for a part of the extension movement of the indicating element if the same has already traveled a part of the way to its end position. Further, this force chain is mechanically determined, i.e. spring forces are transmitted to the indicating element by means of rigid force transmitting members such as levers.

The supporting points of the coupling elements or of the indication device can each be provided on the actuating element. Generally, the indication device can be designed for its demounting from the vacuum lifter either as a partial or complete structural unit with the actuating element, for instance by dissolving the articulated connection of the actuating element to the connecting element that is coupled to the suction plate.

The indication device can be articulated to the adjacent coupling element by means of an appendix, and the indication device and the appendix can be arranged for a longitudinal displacement against each other in the manner of a piston.

According to a further particularly preferred embodiment of the invention, the coupling mechanism is formed as a mechanical displacement transmission, so that in the case of a vacuum reduction it preferably continuously translates dislocations or deformations of the suction plate into amplified displacements of the indicating element in a force-transmitting fashion using the indicating element, from the beginning of the vacuum loss and during the extension of the indicating element toward its end position of indication. This particularly applies to a position of the indicating element in which the same has already partly moved from its initial position to its end position or to the entire movement of the indicating element from its initial position to its end position. The displacement transmission can thus be effectuated by the force transmission in the flux direction, i.e. from the suction plate toward the indicating element. Accordingly, the indication of a vacuum loss can take place already from the beginning of a vacuum loss and not only from a significant threshold. The end position of indication is assumed at a vacuum loss which is also significant, for instance, if the partial vacuum does no longer guarantee a secure hold of the vacuum suction device. The movement of the indicating element, e.g. an extension movement, accordingly continuously extends over a significant vacuum interval. The continuous movement can be linear or possibly also non-linear, e.g. increasing disproportionately with an increasing vacuum loss. Continuously means that with the progress of the vacuum loss, the observer can observe a progress in the change of the position of the indicating element with at least one or more intermediate stages. The continuous decrease in the partial vacuum can be observed by means of the indicating element which is capable of changing its position gradually or continuously with the change of the partial vacuum. Preferably, the movement is continuous, i.e. without steps or discontinuities. The displacement transmission additionally provides for a sensitive indication of a vacuum loss. Due to the coupling mechanism, the indicating element is capable of performing a preferably continuous movement between an initial position at a maximum partial vacuum and an end position of indication at a loss of partial vacuum.

In this embodiment, the dislocations or deformations of the suction plate are then continuously translated into amplified displacements of the indicating element in a force-transmitting fashion during the extension of the indicating element. Accordingly, a targeted force transmission of the suction plate movement to the indicating element takes place via the coupling mechanism, in order to effect a movement of the indicating element through this transmission of the force effects. The transmission of the force effects thus causes a flux line from the suction plate to the indicating element, in order to effect a movement of the indicating element, and this movement is amplified compared to a movement of the suction plate. The amplification takes place through the displacement transmission and/or force reduction of the coupling elements. The position of the indicating element, starting from the initial position thereof and from the initial position of the suction plate, is always determined mechanically. The transmission ratio of the coupling mechanism (ratio of the dislocation of the suction plate to the dislocation of the indicating element) is accordingly mechanically pre-defined over the entire indication movement of the indicating element. A mechanical undefinedness, as it exists for instance if the partial vacuum is transmitted to the indicating element by a thin elastic diaphragm, is thus excluded. Accordingly, a reliable indication is given even under most different environmental conditions, for instance even at different ambient temperatures (e.g. outdoor conditions in summer/winter) at which an elastic diaphragm does not work reliably. It is thus possible to continuously observe a vacuum loss from the beginning.

It goes without saying that possible spring elements of the coupling mechanism are preferably designed in such way that the coupling mechanism preferably continuously moves the indicating element to its end position of indication, from the beginning of a vacuum loss or throughout the extension movement of the indicating element.

Preferably, the mechanical displacement transmission includes at least one rigid force transmitting element or, concerning the flux line, exclusively consists of rigid transmission elements which are articulated to each other or which are connected to each other so that they are variable in their position. Such force transmitting elements, possibly in combination with each other, can be rigid linkage parts, gears or the like, which allow a mechanically defined force transmission from the suction plate to the indicating element. If necessary, also other machine elements can be provided in the transmission mechanism.

Preferably, at least one or all of the force transmission elements and/or the indicating element which are each different from the elements of the actuating mechanism can be formed as pivot levers. One or more pivot levers of the transmission mechanism can be eccentrically supported and thus effectuate a displacement transmission with respect to the indicating element.

Preferably, the coupling mechanism is formed as a rods or gear transmission, which can generally apply within the scope of the invention. Dislocations of the suction plate can be defined and transmitted to the indicating element free from environmental influences while the suction plate is continuously coupled to the indicating element during its extension movement toward its end position. This allows implementing defined force transmitting actions at high transmission ratios.

The coupling mechanism can be designed such that the movement of the indicating element, e.g. an extending movement, continuously extends over a significant vacuum interval, e.g. an interval of $\geq 0.01$ to 0.025 bar or $\geq 0.05$ to 0.075 bar or also $\geq 0.1$ to 0.15 bar. The interval can also amount to $\geq 0.2$ bar to 0.3 bar. The interval can amount for instance to $\leq 0.5$ to 0.75 bar or $\leq 0.2$ to 0.35 bar, so that it still provides for a certain hold of the vacuum suction device on the fixing area.

The following may generally apply within the scope of the invention.

Particularly preferably, the indication device is designed such that a failure of one element of the same indication device indicates an apparent vacuum loss, whereas the indication device does not indicate the existence of a (sufficient) partial vacuum in spite of a vacuum loss. Further, the indication device can be designed such that a failure of one element of the same indication device does not result in a negative effect on the actuating mechanism and hence on the partial vacuum that has been created. To this end, a coupling element of the indication device can engage on a connecting element provided between the suction plate and the actuating element or on a coupling position which is arranged remote from the (articulated) connection between the actuating element and the connecting element, i.e. on the side of the suction plate facing away from the connecting element. Accordingly, the indication device is no longer within the flux of the actuating mechanism. This specially applies to a possible spring element of the indication device which can be provided in addition to a spring element of the actuating mechanism.

Generally, further modifications of the transmission ratio are possible. Leaf springs can be provided for example as spring elements, which can simultaneously perform the function of a transmission element (coupling element) and of a spring element.

Further, it is conceivable that instead of moving an indicating element relative to the actuating element in the case of a vacuum loss, the actuating element itself (especially if designed as a rocker arm) travels an indication distance with respect to the supporting cup of the vacuum suction device. To this end, the spring element of the actuating mechanism or a different spring element of the indication device can act on a supporting element of the actuating element that is capable of changing its position with the changing partial vacuum.

Further, a coupling element can be provided on the suction plate, including the stiffening element, which transmits a dislocation of the suction plate in at least some areas, e.g. in the middle part thereof, to the indicating element. On the one side, the coupling element enables a mechanically stable coupling of the indicating element to the suction plate, and the indicating element can be easily exchanged or change its position relative to the suction plate, on the other side, to adjust for instance the vacuum indication device. Accordingly, the coupling element and the indicating element are preferably fixed to each other in a detachable and/or telescoping fashion.

According to a preferred embodiment, the coupling element and/or the indicating element can be designed as pivot levers. In this case, the coupling element and/or the indicating element are preferably pivotable in a plane transverse or parallel to the main plane of the suction plate, preferably in a plane perpendicular to the main plane of the suction plate. Due to the pivotable support of the respective element, high indication sensitivity can be achieved at a given dislocation of the suction plate, to which end a displacement transmission of the dislocation of the part of the suction plate into an amplified displacement of the indicating element takes place.

If the coupling element and the indicating element are each designed as a pivot lever or rocker, the same can be supported in a way such as to perform a pivotal movement in opposite directions upon a decrease in the partial vacuum, thus achieving a particularly compact construction. The indicating element and/or the coupling element can be supported for pivoting on the actuating element of the actuating device, and the actuating element can also be specially designed as a pivot lever. In this embodiment, but also generally, the indicating element can be floatingly supported on the component forming an abutment. In particular, the indicating element can rest against the underside of the actuating element by a bead-like elevation while forming an articulated connection.

On the one side, the coupling element, which can be designed in the manner of a part of a linkage, can be articulated to a connecting element engaging on the suction plate and the connecting element can be designed as a tension bar that extends substantially perpendicular to the main plane of the suction plate. Further, the coupling element can be articulated to the actuating element of the actuating device. These two articulations can be arranged adjacent to each other, so that their distance from each other is smaller or substantially smaller than the distance of the pivot bearing of the indicating element to one or both of the above-mentioned articulations or to a connection or a part of the articulation of the coupling element to the indicating element. The indication range of the indicating element can be arranged so as to be facing the articulation of the coupling element to the connecting element, particular in space, and the bearing of the indicating element can be arranged so as to be facing away from this articulation.

In the actuation position of the actuating element at a maximum partial vacuum, the indicating element can be fixed in its position, thus providing for a reliable indication device. The positional fixing can be reversed with the decrease in the partial vacuum. Accordingly, at a maximum partial vacuum, the end portion of the indicating element facing away from the indication range can be fixed in its position between the actuating element and the coupling element by the said components abutting each other. With the decrease in the partial vacuum a tolerance or clearance can be produced between the indicating element and the actuating element and/or coupling element. This tolerance or clearance enables a displacement of the indicating element, so that the same indicates a decrease in the partial vacuum.

Preferably, the coupling element or at least a part of the indicating element forms a part of the actuating element for creating a partial vacuum. A component of the actuating mechanism which is different from the suction plate and which can also be different from a tension bar engaging on the suction plate can thus simultaneously be a part of the indication device. This part can be arranged for example between the tension bar and the actuating element, which is preferably designed as a rocker, so as to transmit forces.

The indicating element can be designed so that it can slide while being coupled to the coupling element. Preferably, the coupling element and/or the indicating element at least substantially extend perpendicular to the main plane of the suction plate thus enabling a particularly easy and direct transmission of dislocations of the suction plate caused by a change of the partial vacuum to the indication device. To provide a particularly robust and durable indication device, the coupling element and/or the indicating element can be axially guided in an axial guide, so that the dislocations of the suction plate can be reliably transmitted to the indicating element. Independently thereof, the indicating element and the coupling element can be arranged coaxially to each other and can be connected to each other in a force-transmitting manner, for instance in the form of mutually fixed parts of a linkage or pins. The indicating element can generally represent an extension of the coupling element. The indicating element can generally be designed in the manner of a tension bar, so that a change of the partial vacuum can be easily and reliably indicated by the displacement of the tension bar with respect to a reference point or by its extension from or retraction into a housing part of the indication device.

The indicating element can be generally designed such that at a decrease in the partial vacuum the indicating element performs a translational movement, preferably a translational movement at least substantially perpendicular to the main plane of the supporting cup. Alternatively, even at a decrease in the partial vacuum, the indicating element can perform a pivotal movement in a plane transverse or parallel to the main plane of the supporting cup. For this purpose, the indicating element can be designed for example as a pivot lever, and a coupling element that is connected to the suction plate acts on one of the lever arms of the pivot lever, while the other lever arm of the pivot lever performs the function of an indicating element. Between the suction plate and the indicating element also a transmission mechanism can be provided, so that at a decrease in the partial vacuum and at a spacing of the middle part of the suction plate from the fixing area, the indicating element which is designed as a pivot lever also performs a movement in a different direction, for instance a pivotal movement, in which the indicating element is pivoted upwards and away from the supporting cup or in which the indicating element is pivoted in plane parallel to the supporting cup. Pivoting of the indicating element can also be effectuated in a plane perpendicular to the main plane of the supporting cup.

Further, the indication device can comprise adjustment means enabling a zero adjustment of the indication device and/or the adjustment of the indication position of the indicating element with respect to the partial vacuum whose shortfall has to be indicated. Thus the partial vacuum from which the indication device indicates a change of the vacuum is adjustable and can be freely selected. For this purpose, the indicating element can be designed for changing its position with respect to the coupling element and/or the suction plate, especially while changing the distance to the suction plate. For this purpose, the indicating element can be telescoping with respect to the coupling element, for example by a screwed connection between the coupling element and the indicating element. To this end, the indicating element can be received in a threaded bore of the coupling element. Alternatively or additionally, the adjustment means can include a reference point capable of changing its position with respect to the indicating element and/or the suction plate. The reference point can be provided on a component adjacent to the indicating element, e.g. a housing part of the indication device surrounding the indicating element at least over a part of its circumference. The housing part can be variable in its position.

The indication device is thus fully or at least partly integrated in or received by the actuating mechanism. This can apply to the indicating element or to the overall indication device. Concerning the components which are different from the actuating mechanism, the indication device or the indicating element thereof is particularly preferably fully or at least partly integrated in or received by the actuating element of the actuating mechanism.

Further, the indicating element can generally couple to the suction plate via a part of the actuating mechanism. The indication device can comprise a housing part which is variable in its position by actuating the actuating device and which can be moved to an operative position of the suction lever in which a maximum partial vacuum exists. A change of the partial vacuum can be indicated through a displacement of the indicating element with respect to the housing part or a different point of reference. The housing part can be designed for sliding, in particular vertically, to the main plane of the suction plate. The housing part can be coupled to or, if necessary, supported by the actuating element of the actuating device, so that at the same time also the housing part of the indication device is variable in its position by means of the actuating element. Accordingly, generally within the scope of the invention, the actuating element of the actuating device can be designed as a knee lever or rocker. The actuating element can engage on the suction plate via a connecting element such as a tension bar for example. The connecting element can generally be identical with the coupling element that connects the indicating element to the suction plate. Accordingly, by actuating the actuating element also the connecting element or the coupling element is displaced while creating the partial vacuum. The indicating element can be designed such that at an existing maximum partial vacuum the indication range of the indicating element is on the level of a reference point, for which purpose the end of the indicating element facing away from the suction plate terminates at least substantially flush with the housing. Thus the indicating element is not separately visible and it cannot be haptically discerned with respect to the housing, i.e. it cannot be discerned as a separate element by palpation. At a decrease in the partial vacuum, the middle part of the suction plate is increasingly spaced with respect to the fixing area, so that the indicating element then extends with respect to the reference point or the housing and thus becomes discernable both optically and haptically by palpation.

If the actuating element is designed as lever, for example as a knee lever or rocker, the indicating element can at least partly penetrate through the lever. The actuating element can comprise a fork-like end portion that faces the suction lever and that can lie against the supporting cup. The indicating element, the housing part of the indication device and/or the overall indication device can penetrate through the actuating element and can be received by the actuating element, e.g. between the two legs of knee lever or rocker.

Accordingly, if generally under the tension of the knee lever or rocker, also the indicating element is changed in its position, e.g. with respect to the supporting cup, by coupling the reference point, e.g. the housing of the indication device, to the lever, the housing can be displaced as well, so that with the lever being in its tensioned state and the partial vacuum being the maximum partial vacuum, the indicating element is in its zero position. The displacement can at least substantially take place perpendicularly to the main plane of the suction plate. After the displacement, the indicating element can at least substantially terminate flush with the housing or also with a part of the lever. Alternatively, also the indicating element can be displaced toward a fixed reference point.

The vacuum suction device can be specially designed as a suction lifter or handle. The vacuum suction device can include only one or also two or more supporting cups, each having one suction plate. The cups can be interconnected by a handle or in any other suitable manner. Each of the supporting cups can be provided with an indication device of the invention.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1A:
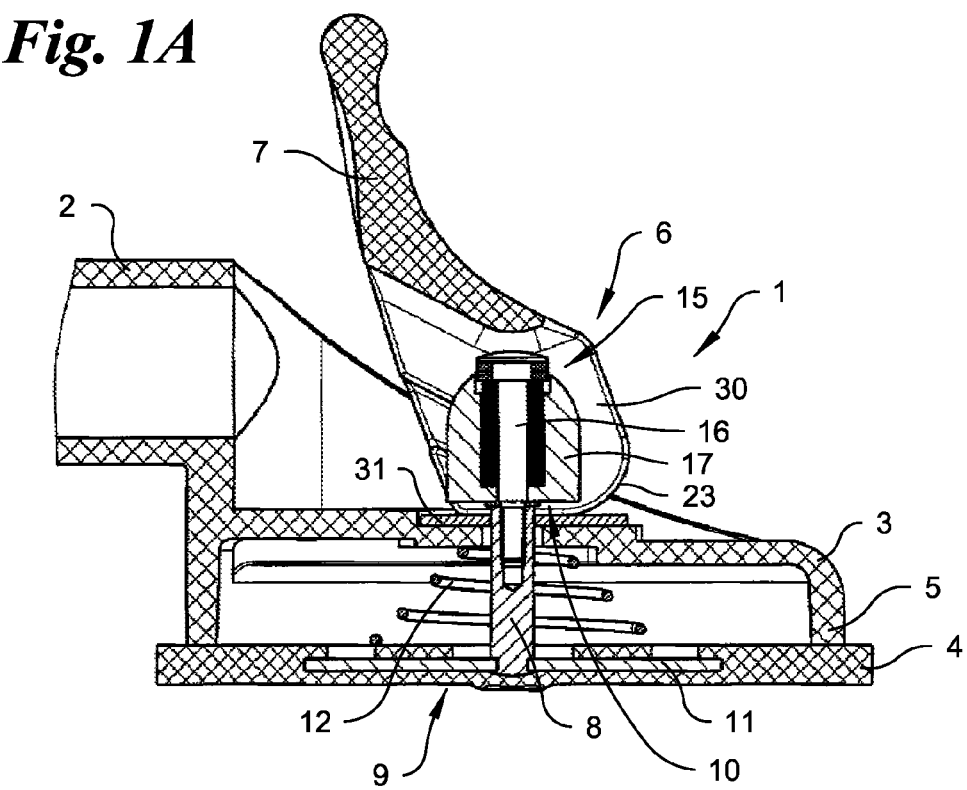
FIGS. 1-3 are illustrations in two cross section 90° apart of a part of a vacuum suction device of the invention in a first embodiment in the relaxed state (FIGS. 1a and 1b), in the tightened state at a maximum partial vacuum (FIGS. 2a and 2b) and in the tightened state at a loss in partial vacuum (FIGS. 3a and 3b)
Figure 1B:
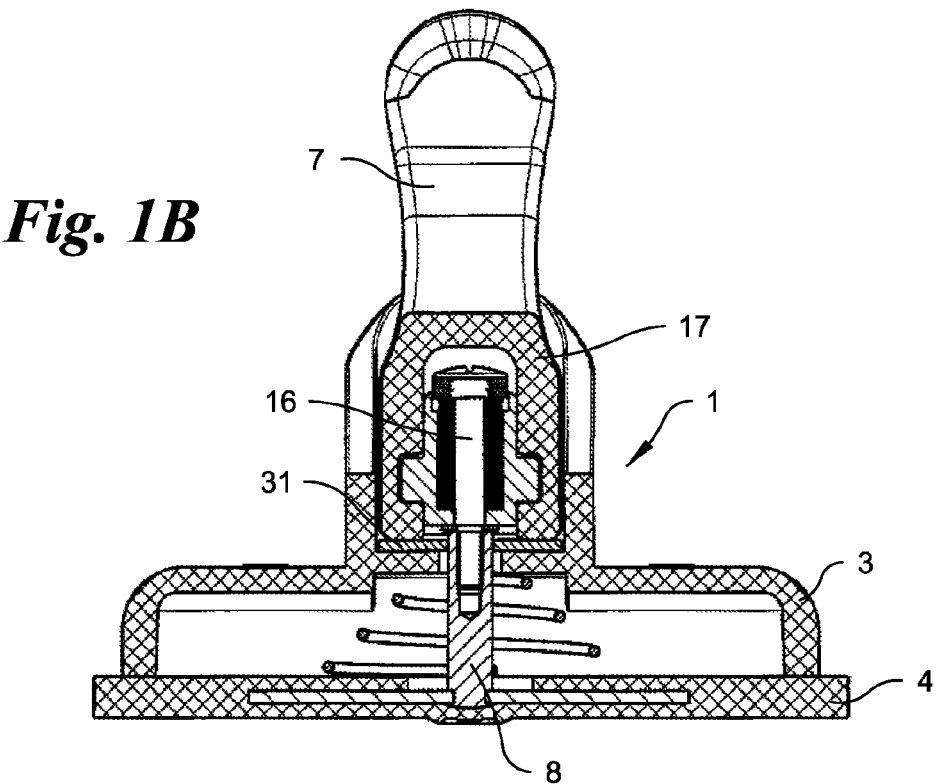
Figure 2A:
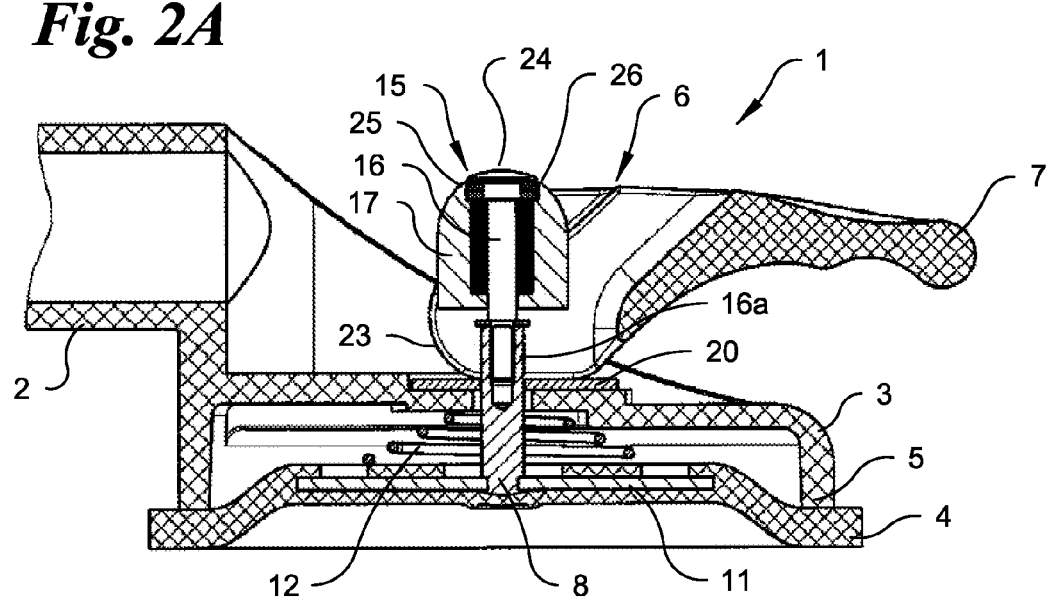
Figure 2B:
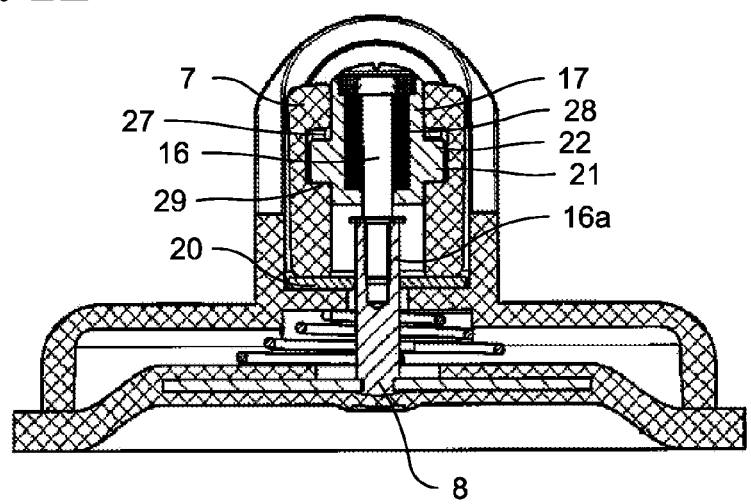
Figure 3A:
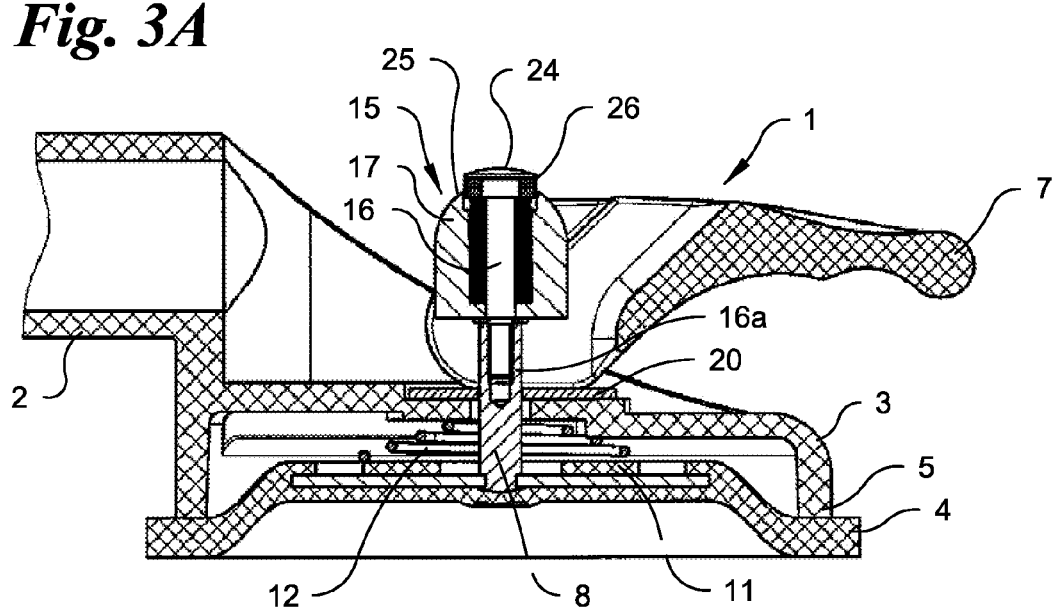
Figure 3B:
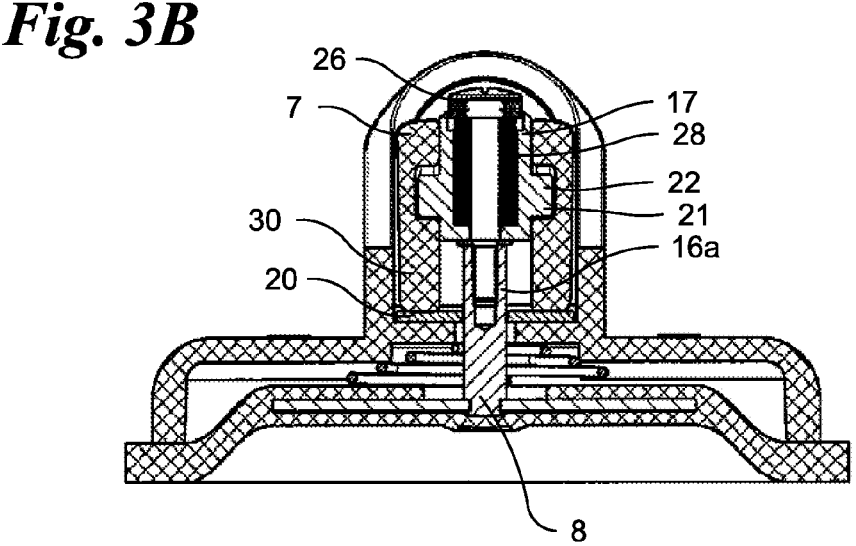

The FIGS. 1 to 3 show a vacuum suction device of the invention in a first embodiment in three different operating states, with the cross sections a and b at an angle of 90° to each other in each of FIGS. 1, 2 and 3. The vacuum suction device 1 includes a handle 2 which interconnects to supporting cups 3 arranged on the end portions thereof.

Each of the supporting cups 3 includes a suction plate 4 made of a flexible, preferably rubber-elastic material which can be pressed against a fixing area by the rim area 5 of the supporting cup. The supporting cup 3 includes an actuating mechanism 6 having an actuating element 7 which is designed for example as a rocker or knee lever and adapted for being coupled to the suction plate 4 by means of a connecting element 8 (or generally by a connecting mechanism), so that upon pivoting the actuating element 7, the middle part 9 of the suction plate 4 is spaced from the fixing area thus forming a vacuum chamber (see FIGS. 2 and 3) to which a partial vacuum is applied. Here, the connecting element 8 is designed as tension bar. The connecting element 8 is adapted for being coupled directly to the actuating element 7, for instance via a connecting yoke, but preferably the coupling is effectuated by means of additional elements which in the present case can simultaneously be a part of the indication device (see below). Further, the connecting element 8 penetrates through an elongate hole 10 of the actuating element 7. For stiffening the middle part 9 of the suction plate 4, the same is provided with a stiffening element 11 in the form of a steel plate vulcanized to the suction plate 4, with the actuating element 7 penetrating through or being coupled to the stiffening element 11. The actuating mechanism is to be actuated against the partial vacuum that is created. For fixing the actuating element 7 in its actuation position, a spring 12 is arranged here between the supporting cup and the suction plate 4, so that the actuating element 7 must overcome a resistance in order to be moved to its initial position, which can also apply to all other embodiments of the invention.

The vacuum suction device further includes an indication device 15 for indicating the partial vacuum in the vacuum chamber. The associated indicating element 16 is designed as a pin-like extension of the connecting element 8. The indicating element 16 is coupled to the suction plate 4 by means of the actuating mechanism, more precisely by means of the connecting element 8, so that at the time the connecting element 8 serves as a coupling element between the indicating element 16 and the suction plate 4. But the indicating element 16 can couple to the suction plate 4 also independently of the connecting element 8, for example, if the same is arranged adjacent to it. But in this case, too coupling is effectuated by means of a coupling element, which can also engage on the central part of the suction plate 4 or on a stiffening element of the same. This mechanical coupling of the indicating element 16 to the suction plate 4 allows a reliable indication of a decrease in partial vacuum directly and easily and independently of external disturbing influences. A change in the partial vacuum generally changes the position of the indicating element 16 with respect to the housing 17 of the indicating device or with respect to a different reference point, in order to indicate a change in the partial vacuum. The indicating element 16 allows a change in the partial vacuum, e.g. a lower deviation of a minimum partial vacuum, to be indicated optically and also haptically or by palpation, e.g. of the indicating element 16 protruding with respect to a reference point that can be provided by the housing part 25 directly surrounding the indicating element 16. Further, also the degree of the decrease in partial vacuum can be indicated by the extent to which the indicating protrudes, which can also be optically and/or haptically detected.

The coupling element 16a (or the connecting element 8) and the pin-like indicating element 16 extend perpendicularly to the main plane of the suction plate 4. The indicating element 16 and the coupling element 16a are arranged coaxially to each other and the indicating element 16 is an extension of the coupling element and is directly fixed to the coupling element. The indicating element 16 is variable in its position or telescoping with respect to the connecting element 8 or the coupling element 8, 16a. To this end, the indicating element 16 engages in an internal thread 19 of the coupling element (or connecting element 8) with a threaded part 18. At a given position of the connecting or coupling element 8, the indicating element 16 can be varied or adjusted in its position with respect to a reference point such as the housing 17, so that the indicating element 16 is adjustable with regard to the partial vacuum to be indicated. Further, according to FIG. 1, the connecting element 8 (or the coupling element) is guided in an axial guide, which can be provided by a part of the supporting cup or, according to the execution example, by a plate 20 which rests on the supporting cup and on which the actuating element 7 designed as a rocker is supported and slides during its tilting movement.

As shown in FIG. 3, the housing 17 surrounding the indicating element 16 is variable in its position by means of the actuating mechanism, if the actuating element 7 is actuated for producing a maximum partial vacuum. To this end, the housing is connected to the actuating element 7 and coupled to it by the projections 21 engaging the recess 22. By this coupling, the tipping movement of the lever is translated into a translational dislocation of the housing 17 and thus of the connecting and/or coupling element 16a. The recess 22 can be arranged in the fulcrum of the rocker, which functions as an eccentric lever. Being coupled to the connecting and/or coupling element 17a, the housing can be spaced from the fixing area, e.g. in a direction perpendicular to the main plane of the suction plate 4.

If the actuating element 7 is actuated or the rocker completely tilted back (FIG. 2) while creating a maximum partial vacuum, the middle part 9 of the suction plate 4 is spaced from the fixing area. During the tilting movement, the rocker travels on a cam track 23, resulting in that the connecting element 8 is guided along in a an elongate hole of the rocker and the connecting element 8 is lifted, which can take place against the force resulting from the partial vacuum and, for a smaller part, against the spring force of the spring 12. Due to its coupling or positive and/or non-positive connection to the actuating element 7, the housing 17 is also lifted and spaced with respect to the fixing area. Then, at a maximum partial vacuum, the end portion 24 of the indicating element 16 facing away from the fixing area terminates flush with the surrounding housing part 25 that can be detected from outside, so that the end portion 24 of the indicating element 16 is perceived as a part of the housing, both on palpation and also optically.

If the housing 17 is mounted to the actuating element 7 with a tolerance, a spring 28 can be provided for instance in the form of a number of plate springs, in order to exert a force to the housing vis à vis the indicating element 42 and urge the housing toward the suction plate 4 and against the corresponding seat such as the surrounding actuating element 7. Independently of the extended position of the indicating element 42, the housing 17 can be pressed against the corresponding seat of the actuating element 7 such as the shoulder 29. In this case, the tolerance may be necessary for moving the actuating element 7 or the rocker to a stable pivoting position, thus avoiding that the rocker automatically returns under spring force to its initial position shown in FIG. 1.

If after reaching a maximum partial vacuum by means of the actuating mechanism, a decrease in the partial vacuum occurs due to unavoidable leakages between the suction plate 4 and the fixing area, the middle part of the suction plate 4 is increasingly spaced from the fixing area, and the connecting element 8 between the suction plate 4 and the actuating mechanism or the coupling element 16a and the indicating element 16 are also spaced from the fixing area. Here, the indicating element 16 can be translated vertically to the main plane of the suction plate 4. Accordingly, while the partial vacuum decreases, the indicating element 16 emerges from the housing 17 or is displaced with respect to a reference point that is provided. On the one side this can be detected by palpation, because the indicating element 16 protrudes with respect to the surrounding housing part 25, and other side this protrusion can be optically perceived. To make the optical perception easier, the end part 24 of the indicating element 16 can have a marking for instance in the form of marking rings 26 that can be different in color from the housing and the end part 24 of the indicating element 16. In particular, several rings having a different color can be provided thus improving the visibility of the degree of protrusion of the indicating element 16. Further, the indication device 15 is integrated in the actuating element 7, to which end the housing 17 can be arranged between the two fork-like legs 30 of the actuating element 7 that is designed as a rocker. This provides for a space-saving construction, and the indication device is protected against external influences.

Figure 4:
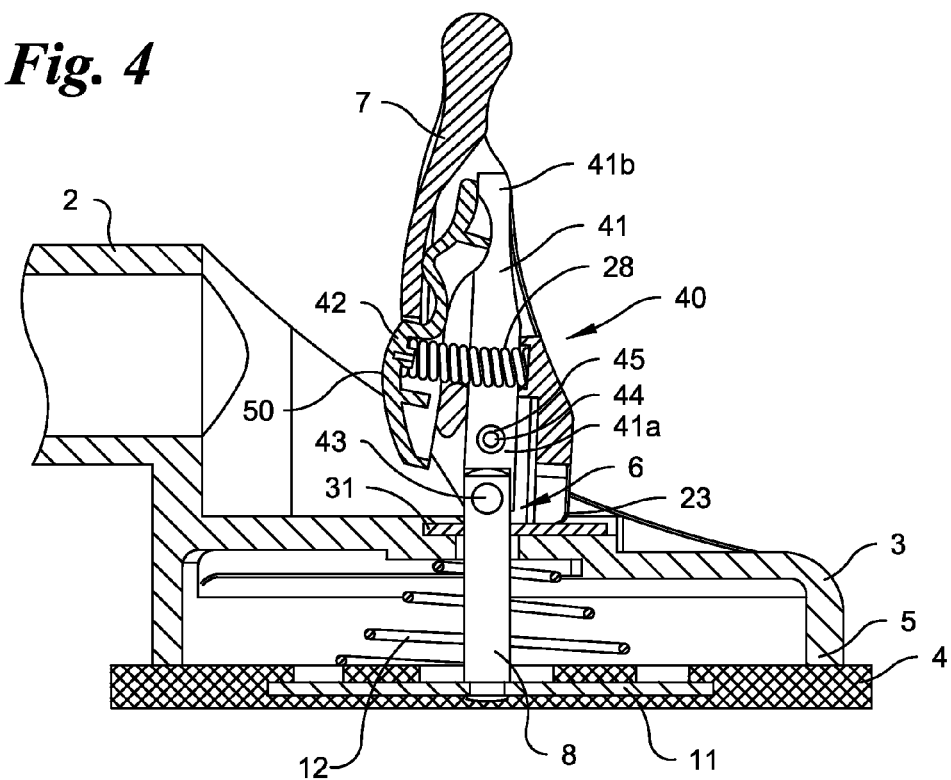
FIGS. 4-6 are illustrations in cross sections of a part of a vacuum suction device of the invention in a second embodiment in the relaxed state (FIG. 4), in the tightened state at a maximum partial vacuum (FIG. 5) and in the tightened state at a loss in partial vacuum (FIGS. 6a, 6b and 6c)
Figure 5:
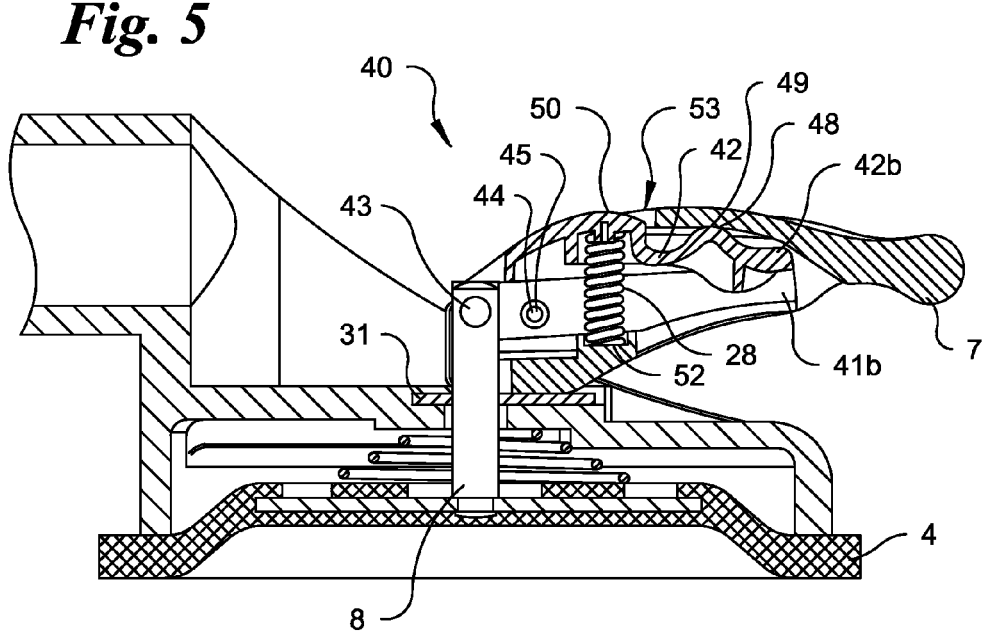

FIGS. 4 to 6 show a further embodiment of a vacuum suction device 40 of the invention. Reference is made to the first embodiment unless otherwise stated and similar components are identified by the same reference numbers.

As a modification of the first embodiment, the coupling element 41 and the indicating element 42 are designed as pivot levers, but it is also possible that only one of these elements is designed as a pivot lever. The coupling element, which in the present case is in the form of a pivoting beam or in the form of pivoting rods, is articulated by its first end portion 41a to the connecting element 8 by means of the articulation 43, with the connecting element 8 being designed corresponding to the previous embodiment and connected to the suction plate 4. By the end portion 42b that is facing away from the connecting element 8, the coupling element 41 couples to the indicating element 42. The coupling element 41 can be pivoted about the axis 44 arranged between the two end portions. The axis 44 is formed by an articulation 45 of the coupling element 41 to the connecting element 8 that may be formed by a pivot pin. Like in the first embodiment, the actuating element 7 couples to the connecting element 8 that may be in the form of a tension bar. To this end, the pin which transversely penetrates through the connecting element 8, which simultaneously forms the articulation 43, can be supported in a seat of the actuating element 7, so that on pivoting the actuating element 7 along the cam track 23, the connecting element 8 is axially displaced and the suction plate 4 lifted.

The indicating element 42 is also supported for pivoting with respect to the actuating element 7. In this case, a floating articulation can be provided. To this end, the bead-like elevation 48, which can contact the inner side of the actuating element 7, can serve as an articulated element. The articulation 49 of the indicating element 42 to the actuating element 7 is thus arranged on the side of the articulation 45 facing away from the connecting element 8. The indication range 50 of the indicating element 42 whose dislocation indicates the change of the partial vacuum, is arranged so as to be facing the articulation 43 or the articulation 45 with respect to the articulation 49.

Furthermore, a spring 28 is provided also in this case, e.g. in the form of a spiral spring that engages on the indicating element 42 and on the abutment 52 in such a manner that because of the spring force the indication range 50 of the indicating element 42 is pushed outwardly with respect to the actuating element 7 and can thus protrude over the upper side 53 thereof and indicate a decrease in the partial vacuum optically and/or haptically. The abutment 52 of the spring 28 is formed by a part of the actuating element 7.

In the state illustrated in FIG. 5, in which the suction device is tightened and the partial vacuum is maximal, the coupling element 41 and the actuating element 7 are angled or substantially vertical with respect to the connecting element 8. The indicating element 42 indicates the maximal partial vacuum, for which purpose the indication range 50 terminates substantially flush with the upper side 53 of the actuating element 7. The end portion 42b opposing the connecting element 8 is preferably fixed in a form-locking fashion in its position between the end portion 41b of the coupling element and the actuating element 7 or only has a small tolerance with respect to these two elements. With this way of fixing, also the indication zone 50 of the indicating element 42 is fixed in its position, e.g. relative to a manual depression.

Figure 6A:
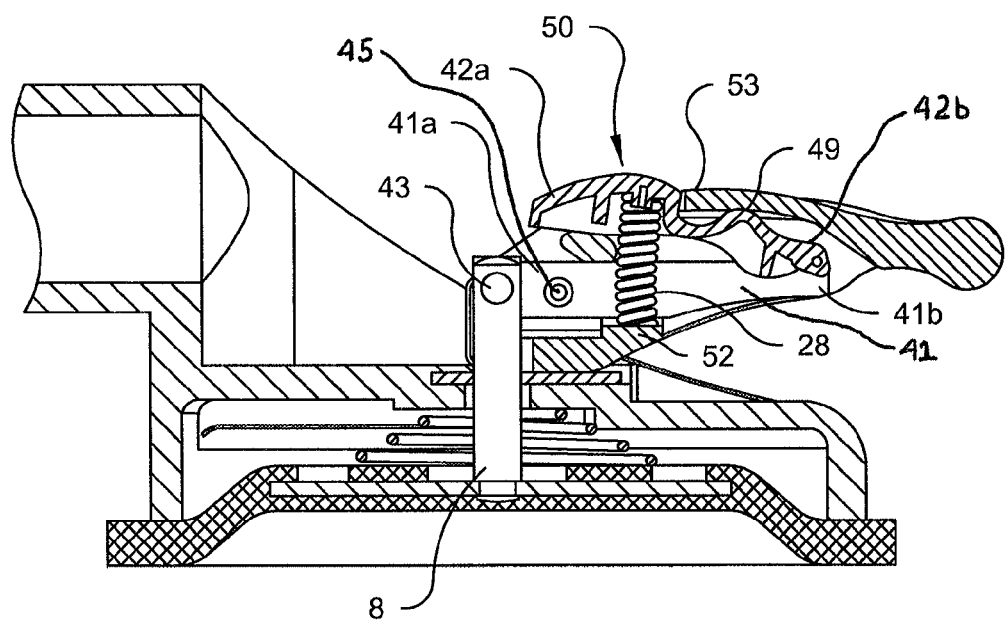

At an occurring vacuum loss, as is illustrated in FIG. 6a, the middle part of the suction plates 4 is slightly lifted and is slightly spaced from the fixing area. The coupling element 41 thus performs a pivoting movement about the articulation 45, so that the end portion 41a facing the connecting element 8 is lifted and the end portion 41b is lowered with respect to the position illustrated in FIG. 5. Due to this lowering movement of the end portion 41b of the coupling element, also the indicating element 42 performs a pivoting movement, so that the indication range 50 is pushed upward and forward with respect to the upper side 53 of the actuating element 7 and thus indicates the loss in partial vacuum. The end part 42b of the indicating element 42 facing away from the connecting part 8 is lowered with respect to its initial position in FIG. 5. The end portion 42b can permanently contact the end portion 41b, so that the dislocation of the indication range 50 is controlled by the dislocation of the end portion 42b of the indicating element 42 opposing the articulation 49. The permanent contact of the end portions 41b, 42b is caused by a spring 28, which is arranged on the opposite side of the indicating element 42.

Figure 10A:
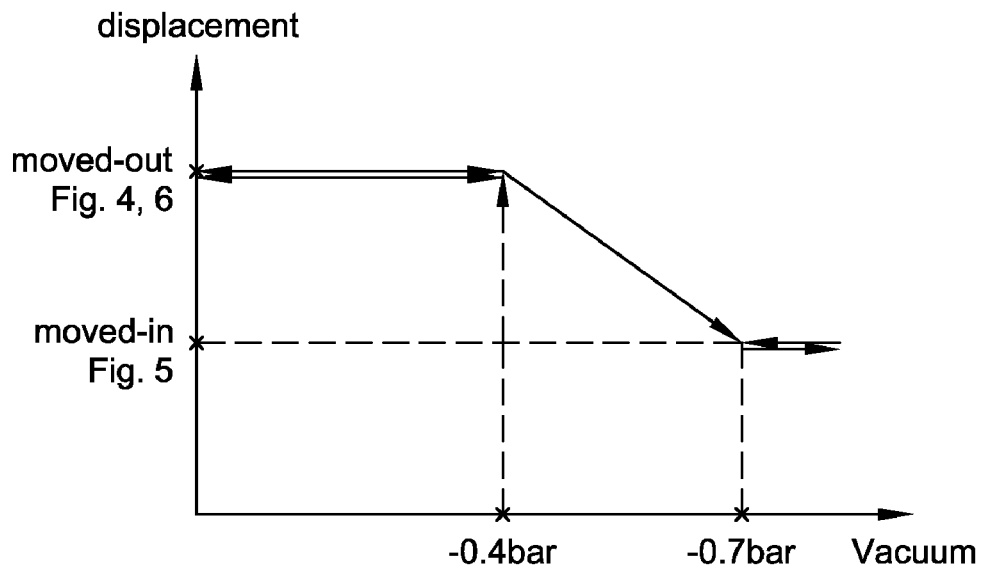
FIGS. 10a and 10b are schematic illustrations of the partial vacuum displacement curve of the indicating element of the vacuum suction device according to the FIG. 1-3 or 4-6 (FIG. 10a) and of a vacuum suction device according to the FIGS. 7-9 (FIG. 10b).

Accordingly, a coupling mechanism is provided which, according to the embodiment, is implemented particularly by the described arrangement of the spring 28 and the arrangement of the supporting points and articulations of the indicating element 42 and the coupling element. In this coupling mechanism, when the actuating mechanism is actuated while creating a partial vacuum until reaching the maximum partial vacuum from a defined threshold (e.g. −0.4 bar), the indicating element 42 is constantly and practically continuously moved to its initial position until a maximum partial vacuum (e.g. −0.7 bar) is created, and prior to reaching the partial vacuum threshold of e.g. −0.4 bar, any noticeable movement of the indicating element 42 does not take place, at least not practically (FIG. 10*a*). On the other hand, after reaching the maximum partial vacuum (in this case approx −0.7 bar) upon a continuous partial vacuum loss and in the mechanically coupled condition, a practically continuous dislocation of the indicating element 42 toward its (extended) indication position takes place, with the first-mentioned progression of the vacuum being reversed, until a defined threshold is reached, at which the partial vacuum is insufficient (in this case −0.4 bar) and the indicating element 42 is practically fully moved to its indication position. In this position, the indicating element 42 can rest against a limit stop, e.g. on the actuating element 7, so that any further loss in partial vacuum is no longer indicated. The displacement-time characteristic of the indicating element 42 can be practically hysteresis-free. This can be achieved in that during the process of indication of the loss of partial vacuum only low friction movements exist at the supporting points 43, 44, 41*b*, 42*b* as well as 49, if the material combinations of the friction partners are favorable. Furthermore, the displacement-vacuum characteristic between the moving points of the indicating element 42 can be at least substantially linear or very linear. This is achieved by the mechanical force or displacement transmission ratio remaining approximately constant at a given arrangement of the supporting and articulation points of the indicating and coupling elements, so that a vacuum which is diminished by a certain amount is in an approximately linear relation to the extension of the spring 28. This displacement-vacuum curve of the indicating element 42 can in case also apply independently of the embodiment.

With the coupling element and the indicating element 42 being designed as pivot levers, the indication device that is integrated in the actuating element 7 also has a simple construction and simultaneously a high sensibility.

The lever system of the vacuum suction device of this embodiment is discussed in more detail with reference to FIG. 6*b*. The terms "input side" and "output side" are each related to the flux originating from the suction plate 4. It should be emphasized that the stated parameters are only exemplary parameters which can be slightly modified, even if a particularly advantageous embodiment is achieved by the stated parameters. The retraction movement and/or extension movement of the indicating element 42 while the actuating element 7 is tightened for creating a partial vacuum or during a vacuum loss, is completely mechanically determined (i.e. independently of a frictional connection) both in this embodiment and generally in the invention, i.e. it results in a defined manner from the displacement-force transmission ratios of the coupling elements, possibly under consideration of the spring characteristic of a spring of the indication device. Particularly, in this case, the indicating element 42 can move in a state of balanced forces between the spring of the indicating device and the partial vacuum, over the entire moving distance between the maximum retracted position and the maximum extended position of the indicating element 42 (retracted position: maximum partial vacuum, extended position: minimum indicated partial vacuum). According to this embodiment, the position of the indicating element 42 in the retracted position is limited by a first limit stop and in the extended position by a second limit stop.

The rocker 41 (coupling element) which is supported for pivoting forms a first displacement transmission with a resulting first transmission WÜ1 (displacement transmission of the change of position of the suction plate 4 toward the indicating element 42) of e.g. 4.11 (input side lever length: 9 mm, output side lever length: 37 mm). The pivotally supported rocker 42 (indicating element 42 or generally a second rocker which is arranged upstream of the indicating element 42 in the flux direction and downstream of the first rocker) involves a second resulting displacement transmission WÜ2 of e.g. 4.06 (input side lever length: 8 mm, output side lever length: 32.8 mm, measured up to the forward indication range of the indicating element 42). In the direction of the flux from the suction plate 4 to the indicating element 42, the displacement transmissions intensify. The force transmission of the rocker 42 is 8 mm/18 mm, hence 2.25 (accordingly only 18 mm, because in this case the lever length on the output side from the pivot axis to the contact point of the spring 28 against the rocker 42 must be taken into account). The design displacement transmission ratio WÜV of the lever arrangement thus amounts to totally 16.70 (4.11×4.06) and the design force transmission ratio KÜV of the lever arrangement amounts to totally 9.25 (4.11×2.25). Accordingly, the mechanical coupling system of the invention which includes one, two or more displacement-transmitting and simultaneously force-reducing coupling elements such as rockers, all in all involves a design displacement transmission ratio WÜV and design force transmission ratio KÜV as a product of the displacement or force transmissions of the individual coupling elements (possibly inclusive of a displacement-transmitting indicating element 42).

Further, upon actuation of the actuating element 7 (rocker), the spring 28 of the indicating element 42 is compressed (this spring is different from the possibly existing spring 12, which attracts the actuating element 7 toward the upper side of the supporting cup or mostly directly engages on the suction cup and/or is arranged between the suction cup and the underside of the supporting cup 3). The compression of this spring 28 can generally take place simultaneously with lifting the suction plate 4 for creating the partial vacuum. The spring 28 of the indicating device (designed as a pressure spring), is compressed in the retracted and extended positions of the indicating element 42 and is less compressed in the retracted position. The spring 28 is arranged on the output pressure side with respect to the flux from the suction plate 4 toward the indicating element 42, hence on the side of the indicating element 42. From the respective compression of the spring and from its spring constants (if necessary under consideration of a spring characteristic), the spring pressure force (e.g. in Newton) is the product which results from these two parameters, namely in the retracted condition of the vacuum loss indication (F1, e.g. 61.9 N) and in the extended condition of the vacuum loss indication (F2, e.g. 49.8 N). The product from the spring pressure force (F1 or F2) and the above-mentioned force transmission ratio KÜV of the coupling mechanism (e.g. 9.25) results in the input side application of force eK1 by the spring 28 of the indication device on the first rocker 41 in the retracted and extended positions of the indicating element 42, e.g. approx 572 N in the retracted position, and in the application of force eK2 of approx 460 N in the fully extended position. The distance traveled by the connecting element 8 (a bolt engaging on the suction plate 4) as a result of the lifting of the suction plate 4 cause by a vacuum loss can amount to approx 0.3 mm and the distance traveled by the indicating element 42 can amount to approx 5.0 mm (hence factor 16.7 between the same, corresponding to the displacement transmission ratio WÜV of the coupling mechanism), each between the retracted and extended positions of the indicating element 42.

Accordingly, this embodiment provides a vacuum loss indication device with threshold. If the suction lifter is drawn against a fixing area and if the force applied to one side of the first rocker 41 achieves or exceeds the value of eK1 as stated above (e.g. 572 N), the vacuum loss indicator is retracted against its limit stop (limit stop 1). This limit stop 42d can for instance be formed by a bottom-side web 42c of the indicating element 42, which web, in this position, can contact a part 41d of the first rocker 41 which serves as an abutment 52 (if necessary, the abutment 52 can be contacted by a different part of the indication device or of the actuating element 7 or the by suction lifter as a whole). In this abutment 52 position, the spring is subject to the force F1. If the force eK1 applied to the first rocker is exceeded, an additional force is exerted on the area of contact of the vacuum loss indication device. During a gradual vacuum loss, the vacuum loss indication device or the indicating element 42 only moves if the value eK1 (e.g. 572 N) is undercut. In the interval between eK1 and eK2, a continuous movement takes place during a gradual vacuum loss and until the indication device is fully extended (according to the embodiment upon reaching the value of 460 N). Below eK2, the vacuum loss indication device is not moved any longer, since it is fully extended then.

Figure 6B:
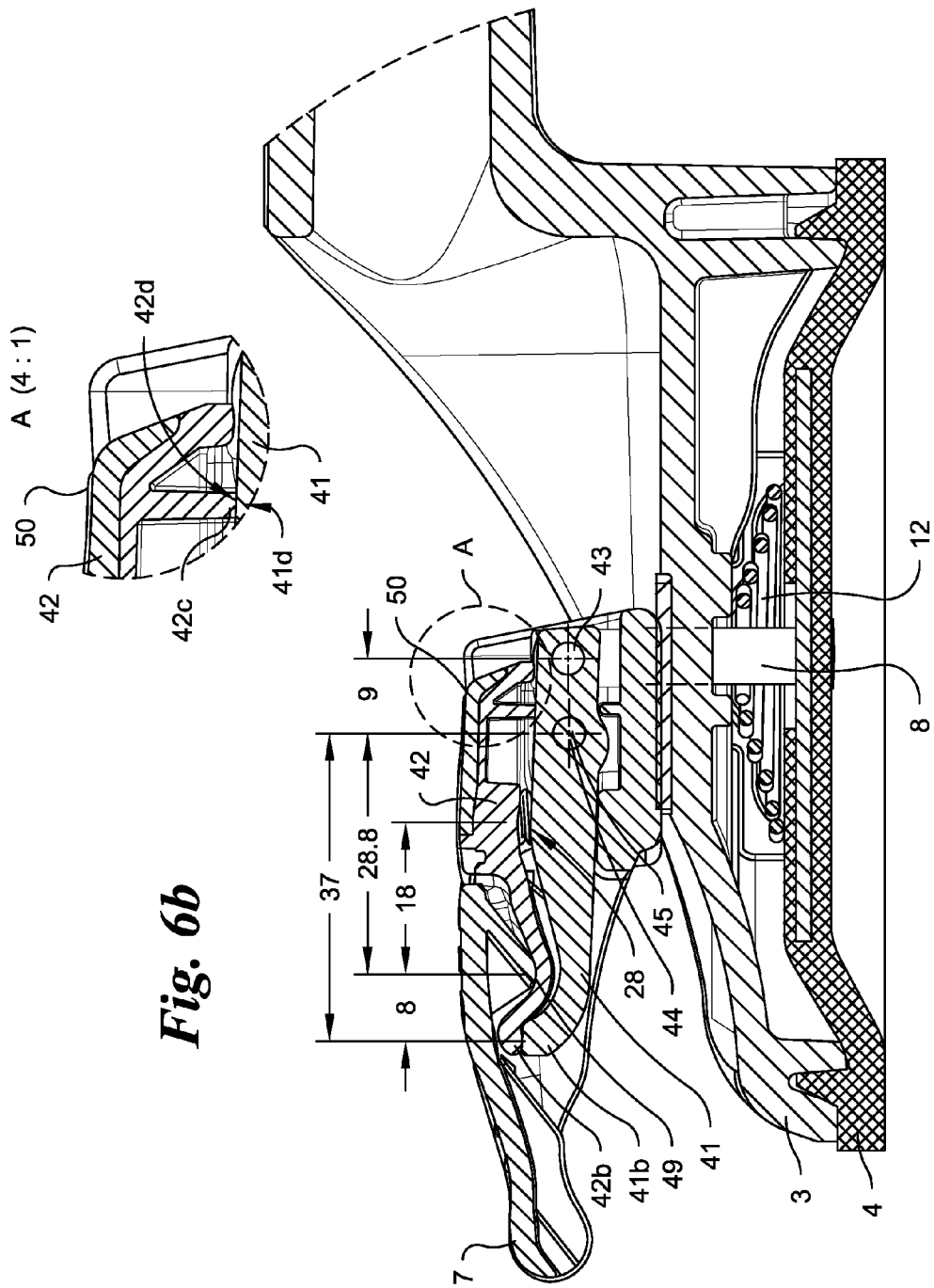
Figure 6C:
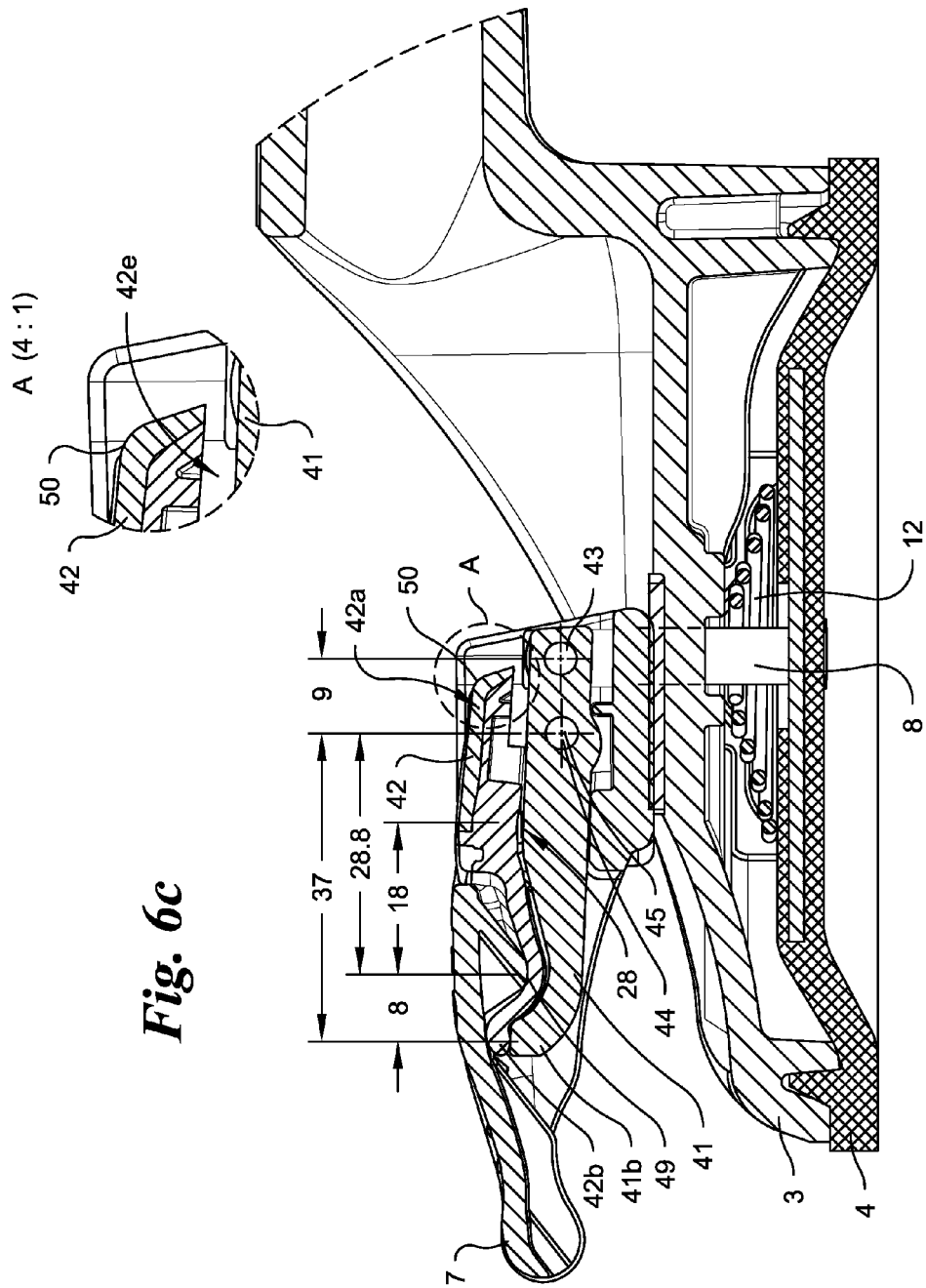

FIG. 6c shows a modification of the suction lifter according to FIG. 6b as a variant without threshold indication. Accordingly, in the case of a vacuum loss, the indicating element 42 not only extends if a threshold is reached but it extends immediately and continuously. This modification can be implemented in that the abutment 52 for the indicating element 42 in the fully retracted position is not provided, thus leaving a free space 42e at the end region 42a between the rocker 41 and the indicating element 42. To this end and taking FIG. 6b as a basis, the limit stop for the web of the indicating element 42 which points downwards can be omitted, for instance by making the web shorter or by taking other suitable measures. If in this variant, the suction lifter is drawn against a fixing area and if the force which is applied as a result of the vacuum power to the first rocker 41 on the input side reaches the value of eK1 (defined in the manner described above, e.g. approx 572 N), the vacuum loss indication device is retracted to the same value as in the above variant including a threshold. The spring 28 (hidden) is then subject to the force F1 (e.g. approx 61.9 N). But if the force eK1 is exceeded, the spring is compressed in its length more than in the above example according to FIG. 6b, which is due to the lacking limit stop. Accordingly, the spring is compressed to such an extent that its force in total with the force transmission ratio KÜV of the lever arrangement (e.g. 9.25) corresponds to the force acting on the first rocker 41 on the input side, which force is exerted due to the partial vacuum. In the case of a vacuum loss, the force indication device starts moving immediately and continuously until it is fully extended upon reaching the force eK2 (definition as above) which is applied. The indication device can be provided with a reference point for the indicating element 42, either adjacent to the indicating element 42 or at different location, so that under normal use of the suction lifter it can be seen when the indicating device has reached its fully retracted position and when the indicating device is extended at least to a minor extent as a result of a certain vacuum loss. That what has been mentioned above can analogously apply if a displacement transmitting indicating element 42 is replaced by a corresponding displacement transmitting coupling element and if the indicating element 42 merely couples to the coupling element without any further transmission, e.g. merely forms an extension of the coupling element.

Figure 7:
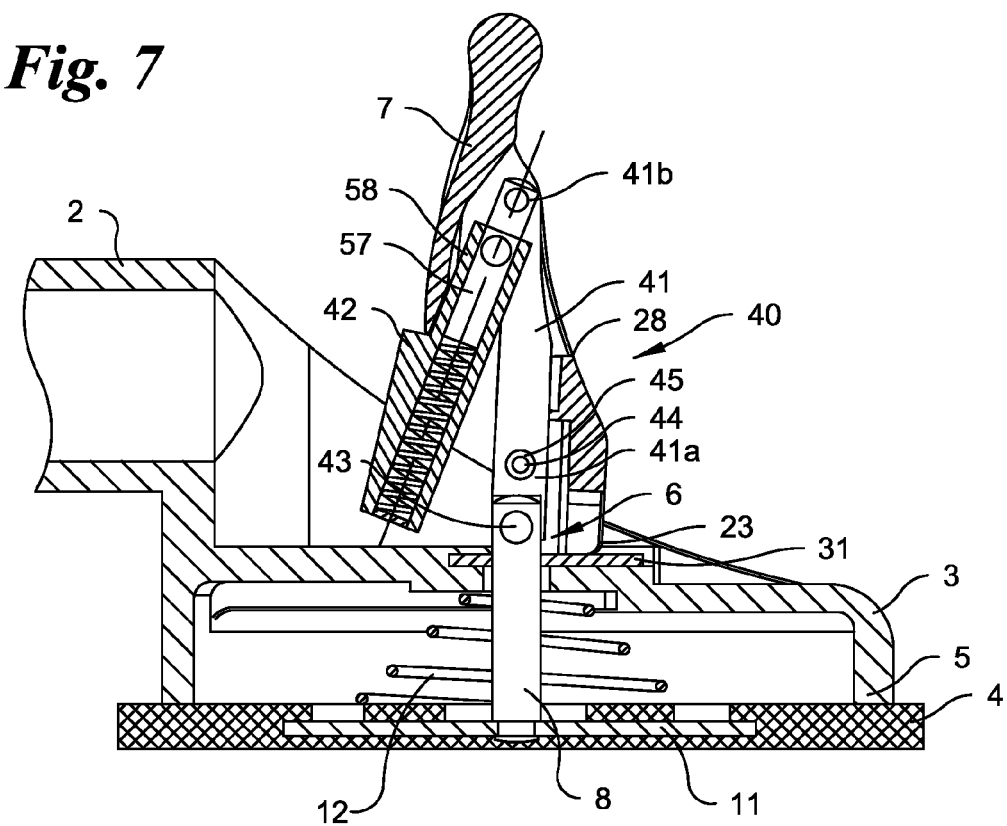
FIGS. 7-9 are illustrations in cross sections of a part of a vacuum suction device of the invention in a third embodiment in the relaxed state (FIG. 7), in the tightened state at a maximum partial vacuum (FIG. 8) and in the tightened state at a loss in partial vacuum (FIG. 9)
Figure 8:
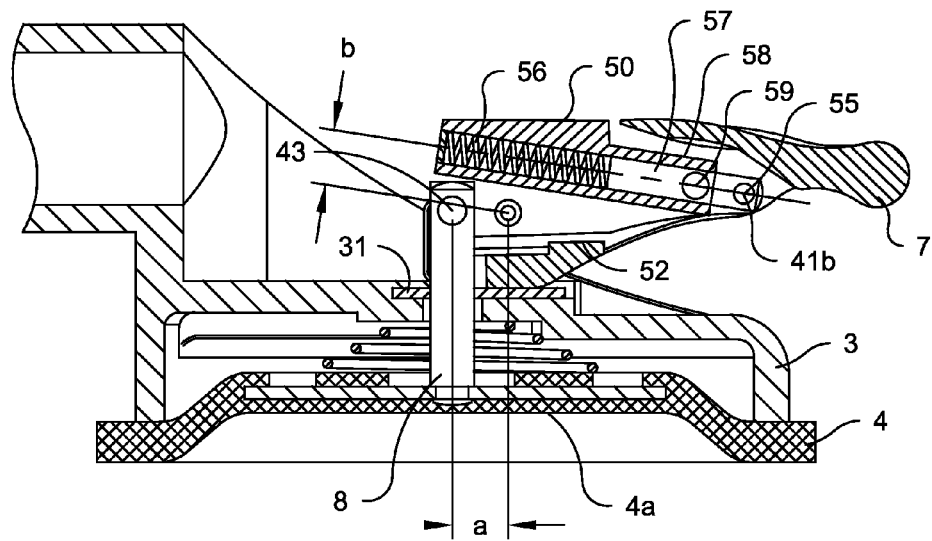
Figure 9:
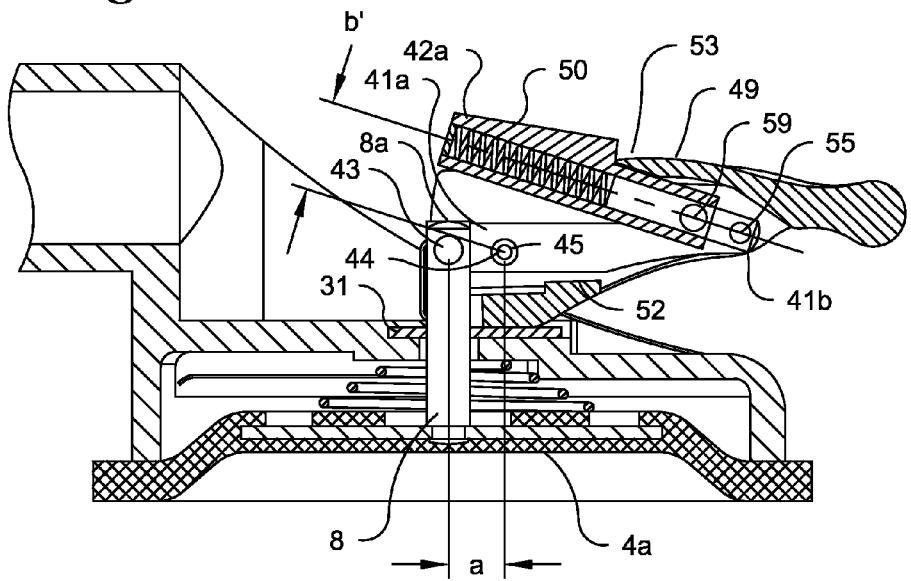

FIGS. 7 to 9 illustrate a modification of a vacuum suction device of the invention embodiment according to the FIGS. 4 to 6. Similar components are identified by the same reference numbers, and reference is made to the previous embodiment, unless otherwise stated.

As in the two preceding embodiments, the indication device and in particular also the indicating element 42 according to this embodiment is at least partly or also fully integrated in the actuating element 7 of the actuating mechanism, so that the indicating device can be completely mounted or demounted by exchanging the actuating element 7.

The indication device 16 in this embodiment also includes a coupling mechanism that comprises at least one coupling element 41. As the partial vacuum decreases, the coupling mechanism according to the embodiment of FIGS. 4-6 translates dislocations of a part of the suction plate 4 (here the center 4a of the suction plate 4) in a mechanically coupled and slowly proceeding fashion into amplified dislocations of the indicating element 42, i.e. at least substantially proportionally to the loss in partial vacuum, whereas the indicating element 42 in this embodiment is transferred from the rest position illustrated in FIG. 7 to its initial position indicating a (maximum) partial vacuum (FIG. 8) in a movement which is at least substantially abrupt and which is caused by applying a sufficient partial vacuum, and while the partial vacuum decreases, the indicating element 42 is transferred to its position according to FIG. 9 indicating a loss in partial vacuum (indication position) in a movement which is at least substantially abrupt.

According to this embodiment, the coupling element 41 is again designed as pivot lever or rocker which is asymmetrically or eccentrically supported for pivoting about the axis 44. This axis simultaneously represents an articulation 45 to the actuating element 7. Similar to the preceding embodiment, the shorter lever end including the end portion 41a is coupled to the connecting element 8 of the actuating mechanism, more precisely, it is articulated to the connecting element 8 by means of the articulation 43. The longer lever end including the end portion 41b couples to the indicating element 8 or is articulated to it by means of a further articulation 55. Like the other articulations, the articulation according to this embodiment can also be configured as a pin-and-hole connection, so that it is capable through the spring element 56 of the indication device to act against the forces substantially caused by the partial vacuum and acting on the articulation 43. The coupling element 41 is articulated to an appendix 57 coupling to the indicating element 42 so as to be longitudinally movable which respect thereto, more precisely, the appendix engages a seat 58, here a sleeve-like end of the indicating element 42. The indicating element 42 couples to the spring element 56 of the indication device. According to FIG. 8, this spring element is further biased or compressed by the actuation of the actuating mechanism and while applying a partial vacuum, which also applies to the embodiment according to FIGS. 4-6. The indicating element 42 on its part is also articulated to the actuating element 7 by means of the articulation 59 (pivot axis). Also the indicating element 42 (including the appendix) is asymmetrically or eccentrically supported, with the short lever end facing the indication range 50 and with the long lever end facing the suction plate 4 or the connecting element 8. With the coupling element 41 and the indicating element 42 (here the appendix) being eccentrically supported in the described manner, a transmission mechanism is generally provided, and an amplification or translation of a dislocation of the part of the suction plate 4 takes place respectively with regard to the thus caused dislocation of the indicating element 42 or its indication range 50. Where appropriate, also more than two transmission elements can be provided. Alternatively, it is also possible for the indicating element 42 not being designed as a transmission element. Instead a second or additional transmission elements can be arranged upstream of the indicating element 42.

All in all, according to the embodiment of FIGS. 7-9, which can also generally apply, a mechanical, continuously effective displacement and/or force transmission is implemented in which, the indicating element 42 is however transferred practically abruptly to its initial position upon the actuation of the actuating mechanism under the production of a partial vacuum, more precisely on reaching the sufficient partial vacuum, and no noticeable movement of the indicating 42 takes place prior to reaching the partial vacuum threshold (nominal value) (FIG. 8). On the other hand, after the actuation of the vacuum lifter at a continuous loss in partial vacuum, the indicating element 42 is practically abruptly transferred to the indication position only on reaching a particular threshold at which a barely insufficient partial vacuum exists, whereas over the preceding progressive vacuum loss a noticeable movement of the indicating element 42 does not take place, at least practically. Also this transfer to the indication position takes place in a continuously force-coupled or mechanically coupled fashion and practically independently of any frictional locking, i.e. independently of overcoming a frictional resistance. This is respectively achieved by the force-displacement transmission ratio being strongly dependent in this case on the position of the indicating element 42 relative to the actuating element 7 and by the spring force of the spring 56 being hardly dependent on this position. Accordingly, this spring force in FIG. 8, multiplied by the distance b to the fulcrum 44, represents a counter torque which is projected to the coupling element and which counters the torque that is applied to the coupling element and that is substantially produced by the partial vacuum. The distance b results from the distance of the extended connection line through supporting point 58 and articulation point 59 to the articulation axis. When the partial vacuum drops and the counter torque produced by the spring force exceeds the torque produced by the partial vacuum, the indicating element 42 separates from the lower limit stop. Thus the distance b to the articulation axis 44 increases and the counter torque increases again, while the force of the spring 56 hardly decreases. This leads to a sudden achievement of the state in picture 9.

If the indicating element 42 shall be brought from the state in FIG. 7 to the state which is illustrated in FIG. 8 rather than to the state illustrated in FIG. 9, with respect to the actuating element 7, by suction against a fixing surface, the force generated by the partial vacuum and acting on the articulation 43 must apply a torque to the coupling element 41 which exceeds the torque that results from the force of the spring 56 multiplied by the distance d'. If this is the case, the distance b' and accordingly also the counter torque which counters the torque that is produced by the partial vacuum decreases. The indicating element 42 now abruptly assumes the retracted position.

Furthermore, as in the embodiment of FIGS. 4 to 6, the overall indication device and particularly its spring element is arranged remote from the articulation 43 between the actuating element 7 and the force-transmitting connecting element 8, with respect to the suction plate 4. If the indication device fails, for example if the spring element of the indication device 56 breaks, the actuating mechanism as such will not be affected in its function. If so, the coupling element 42, even if it is spaced apart from the articulation, could for instance couple to the end portion 8a of the connecting element 8 facing away from the suction plate 4 or a corresponding similar element of the actuating mechanism. Furthermore, as far as the components of the indication device are different from those of the actuating mechanism, the indication device is fully integrated in the actuating element 7 and can be mounted and/or demounted together with the actuating element 7.

Accordingly, at an actuation of the actuating mechanism for creating a partial vacuum, it is generally required on the one side to work against the partial vacuum already produced, and on the other side, work must be performed in order to compress the spring element 56. Due to the described displacement-force transmission, this work is small in view of the short way for the compression of the spring 56, so that only a small effort is required all in all for operating the suction lever in order to create a partial vacuum. Due to the transmission mechanism, it, is generally possible to practically abruptly indicate the full indication distance of the indicating element 42 while the vacuum loss is relatively small.

Figure 10B:
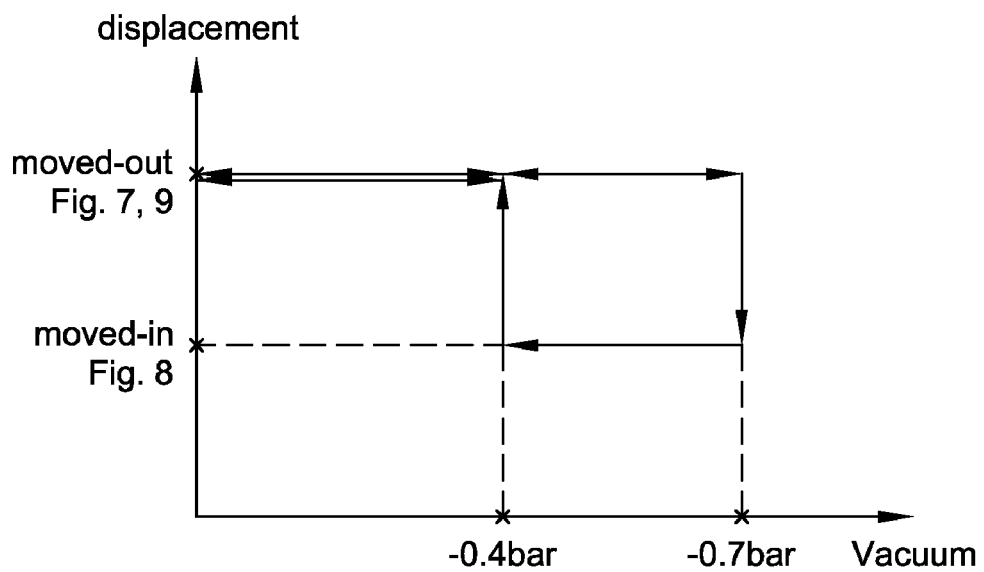
Figure 11:
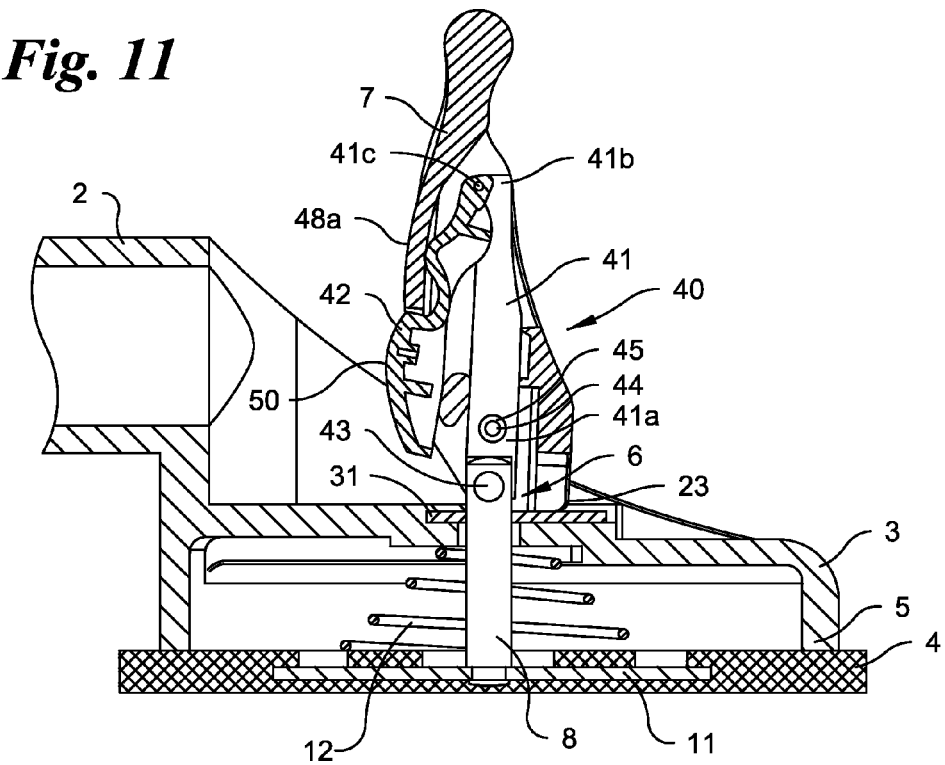
FIGS. 11-14 are illustrations of a part of a vacuum suction device according to a fourth embodiment in cross-sectional views in the relaxed state (FIG. 11), in the tensioned state at a maximum partial vacuum (FIG. 12), in the tensioned state at a partial vacuum loss (FIG. 13), and a schematic illustration of the progression of the partial vacuum of the indicating element of this vacuum suction device (FIG. 14).
Figure 12:
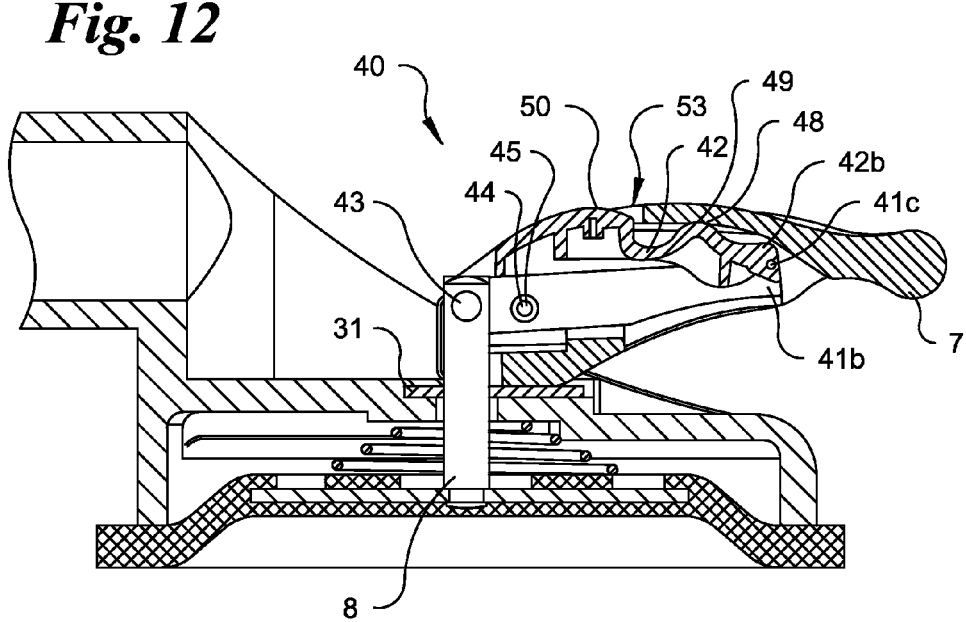

A schematic partial vacuum-displacement diagram of the indicating element 42 according to this embodiment is shown in FIG. 10b. In this embodiment, the indication device is designed in such a way that, when the actuating device is actuated while producing a partial vacuum, the indication device indicates if a predetermined limit of a partial vacuum is exceeded, i.e. if a vacuum exists in the hollow space which is sufficient for the intended use of the vacuum suction device. This can be implemented independently of the embodiment. Here, the partial vacuum according to the embodiment is −0.7 bar. Before reaching the vacuum threshold, a noticeable movement of the indicating element 42 does practically not take place, which means that the indicating element 42 remains in its extended position. This can be achieved by the indication device during the operation of the vacuum suction device being increasingly biased against a mechanical limit stop, with the indicating element 42 in a relaxed, non-operated state of the vacuum suction device being moved from its initial position to a tightened state while on the other hand the spring element acts against the partial vacuum in the hollow space, taking account of the transmission ratio of the coupling mechanism. This initial position of the indicating element 42 is thus controlled also by the level of the partial vacuum in the hollow space and not only purely mechanically by moving the actuating element 7, which as such is not a measure of the produced partial vacuum (e.g. in the case of leakages of the fixing area). Accordingly, the transmission mechanism of the indication device is designed in such a manner that at a selected high or maximum partial vacuum of e.g. −0.7 bar (corresponding to a pressure P1), the indicating element 42 is in its position in which it indicates no vacuum loss and rests against a limit stop that can be provided on the actuating element 7. According to the invention, the level of this partial vacuum is predetermined mechanically, namely due to the spring constant of the spring element and due to the given transmission ratios of the coupling mechanism (not however by a frictional contact, for example, which is difficult to define). If the partial vacuum drops as compared to the above-mentioned pressure P1, the indicating element 42 practically remains in its initial position according to FIG. 8, until the threshold of the vacuum pressure P2 with a low partial vacuum (e.g. −0.4 bar) is established. The indicating element 42 then abruptly extends to its indication position, with the actuating element 7 being fully actuated. In this indication position, the indicating element 42 can rest against a limit stop. This accordingly takes place in the course of a continuous mechanical coupling to the coupling mechanism and via this coupling mechanism also to the suction plate 4. The (sudden) start of the indication of the loss in partial vacuum thus takes place on exceeding a pre-selected vacuum pressure that is also mechanically defined by the coupling or transmission mechanism, more precisely by the spring constant of the spring element of the indication device and the transmission ratio of the coupling mechanism, particularly by the leverage resulting from the arrangement of the described articulations and pivot axes of the coupling element and the indicating element 42 (or of several coupling elements). The thresholds of the vacuum pressures P1 and P2 are thus defined completely mechanically and are selectively adjustable.

According to the embodiment, the ratio b'/b is approx 1.75:1, which necessarily results in that also the pressure ratio P2/P1 of −0.7 to −0.4 bar is determined, which also corresponds to the ratio of b' to b, provided that a corresponding spring 56 is employed. The "switching values" of the indication device with respect to the vacuum pressures which indicate an existing maximum partial vacuum and the lower deviation of a still acceptable partial vacuum can thus be selected according to need and can be mechanically predetermined by the transmission mechanism.

According to a concrete embodiment, the maximal displacement of the connecting element 8 engaging the suction plate 4 can amount to approx 0.4 mm. This results from the movement of the indicating element 42 between the retracted and extended positions. The transmission factor of the transmission mechanism of the suction plate 4 force to the spring of the indication device including the two rockers (coupling element 42 and indicating element 42 with appendix) can amount to approx 9.3. This results in a maximum spring expansion or compression of 3.7 mm. In the indicating element 42 designed as rocker, this can be increased once more, e.g. by the factor of 1.9, so that the indicating distance of the indication range 50 finally is approx 7 mm. Considering that the distance of the indicating element 8 for creating a partial vacuum is 7 mm and that due to the use of the force indication an additional distance of 0.4 mm must be traveled, the work for creating the partial vacuum is increased by 6% (a ratio 0.4 mm:7 mm). It will be understood that the above-mentioned values each depend also on the transmission ratio of the coupling elements (pivot levers) and can be easily changed by changing the supporting points of these elements and/or the loci of the articulation of these elements to each other. On the other hand, due to the here described transmission mechanism of the indication device, the indication device can include a relatively long spring element. For example, under vacuum application (indicating element 42 in its retracted state), the spring element of the indication device can still have a length of approx 20 mm. On a vacuum loss, the length of this spring element will only increase by a relatively small amount, e.g. by ≦50% or ≦20-30% of the same and according to the embodiment, by approx 3.7 mm to approx 23.7 mm.

The articulation between the coupling elements that are designed as rockers (possibly also including the indicating element 42) and the actuating element 7 can be generally configured in such a way that a cup is formed in the coupling element which surrounds an elevation of the actuating element 7. This cup can be formed such that during a movement/tilting of the coupling mechanism practically no frictional movement occurs in the connection between the actuating element 7 and the rocker (e.g. the indicating element 42), but only a roll-off movement takes place at least substantially. Such a configuration can possibly replace a pin-and-hole connection. The second coupling element or the indicating element 42 can be made from a non-wearing plastic material, e.g. glass fiber-reinforced plastic. The first coupling element that can engage the connecting element 8 can be made e.g. of metal and in the form of a yoke, for example, wherein two parallel stiff metal sheets can be provided. The actuating element 7 can generally also consist of a plastic material.

If the indication device is designed in such a way that, when the partial vacuum decreases and a threshold is reached, it causes an indication by the indicating element 42 and that the level of the threshold is defined by a mechanical coupling mechanism independently of a frictional contact, the present embodiments may be modified such that the indicating element 42 is not integrated in the actuating element 7. For this purpose, the support 31 can be designed for example in the form of a disc or in the form of the plate 20 or the abutment 52 of the actuating element 7 can be generally designed as an indicating element 42, especially as a pivoting or tilting indicating element 42. In this case, the indicating element 42 can be generally actuated by a coupling and transmission mechanism here described, and that what has been mentioned above can apply to the full extent. To this end, the actuating element 7 for example can rest against the support 31, which can be disc-like, or against the abutment 52 merely by a relatively small abutment 52 area, so that the support 31 or the abutment 52 can be actuated under the effect of the coupling mechanism in the manner as generally described above. To this end, the coupling mechanism correspondingly engages the support. For this purpose, the part below the support can have a corresponding recess or can be suitably textured so as to generally allow a tilting movement of the support or abutment 52. The pivot lever 41 (possibly with one or more additional pivot levers interposed) can then engage the support, and the support (abutment 52) itself can again be designed as a pivot element, in a manner as described above with regard to the indicating element 42. The spring element 56 can then be correspondingly provided on the support (abutment 52).

FIGS. 11-14 show a part of a vacuum suction device according to the invention in a fourth embodiment and schematically a partial vacuum-displacement curve of the indicating element 42 of this vacuum suction device. This vacuum suction device is a modification of the vacuum suction device according to FIGS. 4-6 and similar components are identified by the same reference numbers. Concerning the basic operation principle, reference is made to the discussion of the vacuum suction device according to FIGS. 4-6, while the differences will become apparent from the following.

Figure 13:
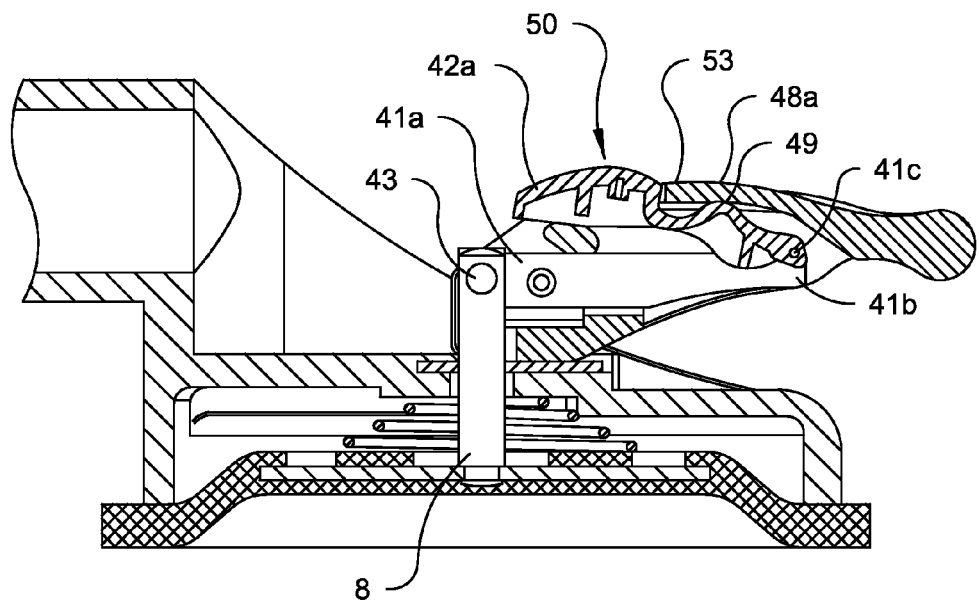
Figure 14:
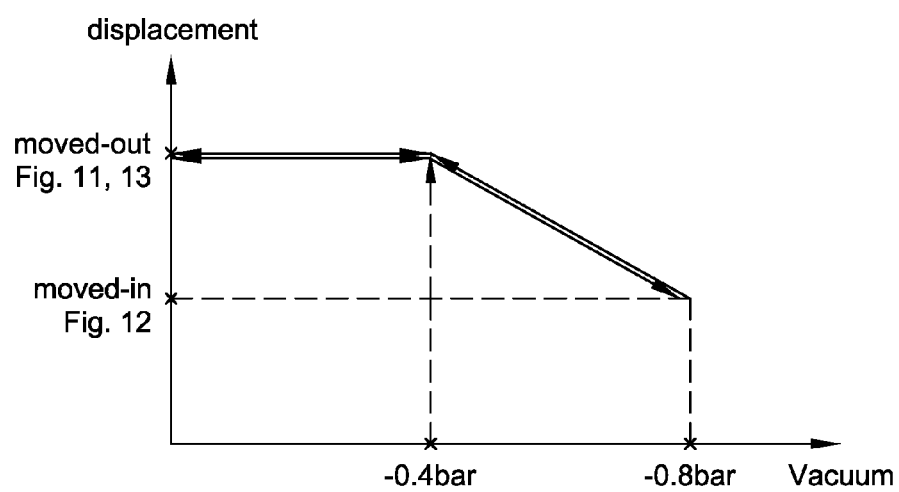

The vacuum suction device 1 has an indication device 40 for indicating the partial vacuum in the vacuum chamber. The indication device is coupled to the suction plate 4 by means of a coupling mechanism and performs a preferably continuous movement between an initial position under a maximum partial vacuum (FIG. 12) and an end position of indication under a partial vacuum loss (FIG. 13). The coupling mechanism is designed as a mechanical displacement transmission, so that in the case of a decrease in vacuum it translates dislocations or deformations of the suction plate 4 in a force transmitting fashion into amplified displacements of the indicating element 42 continuously from the beginning of the vacuum loss and during the extension movement of the indicating element 42 toward its end position by means of the indicating element 42. The associated indicating element 42 is designed as a pivot lever or rocker. The suction element 42 is coupled to the suction plate 4 by means of a part of the actuating mechanism, more precisely by means of the connecting element 8, so that the connecting element 8 simultaneously serves as a coupling element between the indicating element 42 and the suction plate 4. The indicating element 42, rocker 41, connecting element 8 and suction plate 4 correspond to those of the embodiment according to FIGS. 4-6. By the mechanical coupling of the indicating element 42 to the suction plate 4 it is possible to indicate a decrease in partial vacuum by simple constructional means directly and independently of external disturbing influences. Due to the displacement transmission, the suction plate 4 is continuously connected to the indicating element 42 in a force transmitting fashion during the whole extension movement of the indicating element 42. A change in the partial vacuum generally causes a change in the position of the indicating element 42 with respect to a reference point, i.e. the actuating element 7, in order to indicate the change in the partial vacuum. The indicating element 42 allows a change in the partial vacuum to be observed preferably continuously from the beginning of the partial vacuum loss, for instance optically or also haptically, e.g. by means of the indicating element 42 protruding with respect to a reference point. Further, the extent of the partial vacuum loss can also be indicated by the extent of the protrusion of the indicating element 42 and can be preferably continuously observed.

The indicating element 42 and the coupling element 41 are moveable with respect to each other and with respect to the connecting element 8, in order to establish a displacement transmission that translates dislocations of the suction plate 4 during the extension movement of the indicating element 42 into amplified displacements of the indicating element 42 while being continuously coupled to it in a force transmitting fashion (i.e. in the direction of the extension movement). Accordingly, at a given position of the connecting or coupling element, the indicating element 42 can change its position with respect to a reference point, e.g. the actuating element 7, so that the indicating element 42 indicates a partial vacuum loss.

The indicating element 42 and the coupling element 41 are moveable with respect to each other and with respect to the connecting element 8, in order to establish a displacement transmission that translates dislocations of the suction plate 4 during the extension movement of the indicating element 42 into amplified displacements of the indicating element 42 while being continuously coupled to it in a force transmitting fashion (i.e. the force is transmitted to the indicating element 42 in the direction of the extension movement). At a vacuum loss, the indicating element 42 is displaced toward its indication position by means of the coupling mechanism involving the displacement transmission. In this case, with a decrease in the partial vacuum, the indicating element 16 continuously extends with respect to its reference point, here with respect to the actuating element 7, relative to which the actuating element 7 is variable in position. According to the embodiment, the displacement transmitting coupling mechanism substantially consists of the coupling element 41 and the indicating element 42. The following can apply also independently of the same.

The coupling element 41 and the indicating element 42 are designed as pivot levers. But where appropriate, only one of these elements may be designed as a pivot lever. The coupling element 41 couples to the indicating 42 by its end 42b directed away from the connecting element 8. This can be implemented by an articulation 41c, e.g. a hinge pin, which simultaneously maintains the indicating element 42 in its respective position in dependence of the position of the suction plate 4. In this case, the spring 28 of the indication device can be omitted.

Also the indicating element 42 is supported for pivoting with respect to the actuating element 7. A floating articulation can be provided for this purpose, and the beadlike elevation 48 which can be applied against the inner side of the actuating element 7 can serve as a hinge element. Alternatively, the floating articulation can be replaced by a different suitable articulated connection which interconnects components, such as a hinge pin 48a (illustrated by dotted lines) for example. Alternatively or additionally, the indicating element 42 may be downwardly supported by a spring (corresponding to the spring 28 according to FIG. 5), whereas the spring in this embodiment merely serves for holding the indicating element 42 in its initial position, but does not have a spring constant sufficiently high for preventing an indication from the beginning of a vacuum loss, i.e. for urging the indicating element 42 against a limit stop with a significant force.

Accordingly, a coupling mechanism involving a displacement transmission is provided. A continuous and preferably linear movement of the indicating element 42 toward its final position of indication, i.e. until reaching the maximum partial vacuum or until the position of the indicating element 42 is stopped by a limit stop (FIG. 4), already takes place with the beginning of a vacuum loss and thus with the beginning dislocation of the suction plate 4, while the suction plate 4 and the indicating element 42 are continuously coupled in force transmitting fashion, so that the suction plate 4 translates its dislocation into the displacement transmission while applying a force to the indicating element 42. This can also apply to all other embodiments of the invention. Accordingly, the indicating element 42 increasingly extends as a result of the force transmitting displacement transmission, namely in a continuous and smooth fashion. The maximum partial vacuum can be approx −0.8 bar. After a continuous partial vacuum loss under a mechanically coupled state and under a practically continuous change in the position of the indicating element 42 toward its (extended) indication position, the indicating element stops in its second limit position by simply contacting a border of the adjacent component or of a component seating the indicating element (in this case the actuating element 7). This can be the case, if the partial vacuum is insufficient for the respective application (in the present case (−0.4 bar), so that the indicating element is fully moved to its indication position. In this position, the indicating element 42 can contact a limit stop, e.g. on the actuating element 7, so that a further partial vacuum lost is not indicated any longer. The displacement-vacuum characteristic of the indicating element 42 can be practically hysteresis-free. This can be achieved in that during the indication process of the partial vacuum loss only low friction movements exist at the supporting points 43, 44, 41b, 42b and 49 and if the material combinations of the friction partners are favorable. Further, the distance-vacuum characteristic between the movement points of the indicating element 42 can be substantially linear or precisely linear. This is achieved in that with given arrangement of the supporting and articulation points of the indicating and coupling elements the mechanical force or displacement transmission ratio remains approximately constant, so that a vacuum which is decreased by a particular amount is in an approximately linear relationship to the displacement of the indicating element 42. If necessary, this displacement-vacuum gradient of the indicating element 42 can also apply independently of the embodiment.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A vacuum suction device or a vacuum lifter for temporary fixing on a substantially smooth, air-impermeable fixing area, comprising:
    a supporting cup, a flexible suction plate, and an actuating mechanism for creating a partial vacuum between the suction plate and the fixing area while changing a position of the suction plate at least in some regions, wherein a vacuum indication device for indicating the partial vacuum includes an indicating element, wherein the indicating element of the vacuum indication device is coupled to the suction plate and performs a movement between an initial position at a maximum partial vacuum and an end position of indication at a loss of partial vacuum, wherein at least a part of the indication device is integrated in an actuating element or the indication device includes a mechanical coupling mechanism which mechanically couples the indicating element to the suction plate, and wherein (i) the indication device causes an indication through the indicating element if the partial vacuum decreases and if a threshold is reached and such that a level of the threshold is defined by the mechanical coupling mechanism independently of a frictional connection, or (ii) the coupling mechanism is a mechanical displacement transmission that in a decrease in vacuum translates dislocations or deformations of the suction plate in a force transmitting fashion into amplified displacement of the indicating element from a beginning of the vacuum decrease and during an extension movement of the indicating element toward the end position of indication.

2. The vacuum suction device according to claim 1, wherein the mechanical displacement transmission includes at least one rigid force transmitting element or, with reference to a force transmitting line, consists of rigid force transmitting elements articulated to each other or connected to each other so as to be variable in position.

3. The vacuum suction device according to claim 1, wherein the indication device is designed such that the indicating element is a component separate from and variable in position with respect to the actuating element and wherein components of the indication device which are different from an actuating device including the indicating element can be mounted or demounted together with the actuating element.

4. The vacuum suction device according to claim 1, wherein the indication device is designed such that upon creation of the partial vacuum by the actuating element the indicating element is moved to the indication position only on reaching a threshold which corresponds to a nominal value of the partial vacuum to be achieved and which enables an intended operation of the vacuum suction device.

5. The vacuum suction device according to claim 1, wherein the indication device is designed such that at a decreasing partial vacuum and on reaching a threshold, the indication device causes an indication through the indicating element, wherein the threshold corresponds to a partial vacuum which is sufficient for operation of the vacuum suction device, and wherein the indication takes place substantially abruptly.

6. The vacuum suction device according to claim 1, wherein the indication device is designed such that at a decreasing partial vacuum and on reaching a threshold, an indication takes place which continuously increases with the vacuum decrease and which has reached a maximum at a partial vacuum which is sufficient for intended operation of the vacuum suction device.

7. The vacuum suction device according to claim 1, wherein the indication device is designed such that the indicating element is moved to the indication position which indicates a partial vacuum loss or to an initial position at a maximum partial vacuum in a defined fashion by a spring element of the indication device and mechanical coupling mechanism cooperating with the indicating element.

8. The vacuum suction device according to claim 1, wherein the coupling mechanism comprises a rod or gear transmission.

9. The vacuum suction device according to claim 1, wherein on the suction plate or on a stiffening part thereof a coupling element is arranged which is a part of the indication device and translates a dislocation at least in regions of the suction plate.

10. The vacuum suction device according to claim 1, wherein a connecting element is provided between the suction plate and the actuating element for force transmission from the actuating element to the suction plate and wherein:

(i) a rigid coupling element which is part of the indication device engages at a coupling position on the connecting element, or (ii) the coupling position is provided on an articulation between the actuating element and the connecting element or at a position of the coupling mechanism facing away from the suction plate with respect to the articulation between the actuating element and the connecting element, or (iii) both (i) and (ii).

11. The vacuum suction device according to claim 1, wherein at least one coupling or force transmitting element of the indication device, which is different from an element of the actuating mechanism, or of the indicating element is designed as a pivot lever.

12. The vacuum suction device according to claim 11, wherein the pivot lever is eccentrically supported.

13. The vacuum suction device according to claim 12, wherein (i) the coupling element and (ii) the indicating element or a further coupling element are each designed as pivot levers and are supported to perform an oppositely directed pivoting movement on a decrease in partial vacuum.

14. The vacuum suction device according to claim 1, wherein the indicating element is supported for pivoting on the actuating element.

15. The vacuum suction device according to claim 1, wherein a coupling element is articulated to a connecting element engaging on the suction plate on one side and is articulated to the actuating element of the actuating device or to the indicating element on another side.

16. The vacuum suction device according to claim 1, wherein a coupling element is articulated by one end portion to a connecting element engaging on the suction plate and is articulated by another end portion to the indicating element.

17. The vacuum suction device according to claim 1, wherein a coupling element is articulated by one end portion to the indicating element and wherein the indication range of the indicating element is arranged to face the articulation and to face away from a pivot axis of the indicating element.

18. The vacuum suction device according to claim 1, wherein the indication device includes an indicating element fixed in an operating position of the actuating element at a maximum partial vacuum or at a minimum partial vacuum.

19. The vacuum suction device according to claim 1, wherein the indication device includes means for adjusting the indication with regard to a partial vacuum to be undercut.

20. The vacuum suction device according to claim 1, wherein the indication device can change position by an actuation of the actuating device and which can be moved to an operating position of a suction lifter, and wherein by changing the partial vacuum, the position of the indicating element can be changed with respect to the indication device in order to indicate a change in the partial vacuum.

21. The vacuum suction device according to claim 20, wherein the actuating element surrounds the indicating element at least over a part of a circumference thereof.

22. The vacuum suction device according to claim 20, wherein the indication device is supported for sliding such that, by an actuation of the actuating mechanism, the indication device is displaced with respect to a suction cup in a direction at least substantially vertical to a main plane of the suction plate.

23. The vacuum suction device according to claim 1, wherein the indication devices includes a spring element independent of the actuating mechanism and biases the indicating element against the actuating element or keeps a balance of forces between the indicating element during its extension movement and the partial vacuum applied to the suction plate.

24. The vacuum suction device according to claim 1, wherein at least a part of the indication device is integrated in the actuating element, and the indication device includes the mechanical coupling mechanism which mechanically couples the indicating element to the suction plate.

25. A vacuum suction device or a vacuum lifter for temporary fixing on a substantially smooth, air-impermeable fixing area, comprising:
   a supporting cup, a flexible suction plate, and an actuating mechanism for creating a partial vacuum between the suction plate and the fixing area while changing a position of the suction plate at least in some regions,
   wherein a vacuum indication device for indicating the partial vacuum includes an indicating element,
   wherein the indicating element of the vacuum indication device performs a movement between an initial position at a maximum partial vacuum and an end position of indication at a loss of partial vacuum,
   wherein the indicating element is mechanically coupled to the suction plate by a coupling mechanism and such that the coupling mechanism is designed as a mechanical displacement transmission which during an extension movement of the indicating element to an extended end position continuously couples the suction plate to the indicating element in a force-transmitting fashion and on a decrease in vacuum and during the extension movement of the indicating element translates, with the indicating element, dislocations or deformations of the suction plate in a force-transmitting fashion into amplified displacements of the indicating element toward an end position of indication.

26. The vacuum suction device according to claim 25, wherein
   (i) the indication device is designed such that on a decreasing vacuum and when a threshold is reached, the indication device causes an indication through the indicating element and that the level of the threshold is defined by the mechanical coupling mechanism independently of a frictional connection,
   or wherein
   (ii) the coupling mechanism is designed as the mechanical displacement transmission such that in case of a decrease in vacuum, the mechanical displacement transmission translates, with the indicating element, dislocations or deformations of the suction plate in a force-transmitting fashion into amplified displacements of the indicating element, from a beginning of the vacuum decrease and during an extension movement of the indicating element toward an end position of indication.

27. The vacuum suction device according to claim 25, wherein at least a part of the indication device is integrated in the actuating element.

* * * * *

UNITED STATES PATENT AND TRADEMARK OFFICE
CERTIFICATE OF CORRECTION

Page 1 of 1

PATENT NO.        : 8,235,337 B2
APPLICATION NO.   : 12/889584
DATED             : August 7, 2012
INVENTOR(S)       : Heinrich Ostendarp It is certified that error appears in the above-identified patent and that said Letters Patent is hereby corrected as shown below:

Title page, Section (73):

The Assignee should be -- Bohle AG, Haan (DE) --.

Signed and Sealed this
Twenty-second Day of January, 2013

David J. Kappos
*Director of the United States Patent and Trademark Office*